United States Patent
Corset et al.

[11] Patent Number: 5,995,668
[45] Date of Patent: *Nov. 30, 1999

[54] SEGMENTED PICTURE CODING METHOD AND SYSTEM, AND CORRESPONDING DECODING METHOD AND SYSTEM

[75] Inventors: Isabelle Corset; Lionel Bouchard, both of Paris; Sylvie Jeannin, Limeil-Brevannes, all of France; Philippe Salembier, Esplugas-Barcelona, Spain; Ferran Marques, Barcelona, Spain; Montse Pardas, Barcelona, Spain; Ramon Morros, Barcelona, Spain; Fernand Meyer; Beatriz Marcotegui, both of Fontainebleau, France

[73] Assignee: U.S. Philips Corporation, New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/736,771

[22] Filed: Oct. 25, 1996

[30] Foreign Application Priority Data

Oct. 25, 1995 [EP] European Pat. Off. .............. 95402389
Apr. 29, 1996 [EP] European Pat. Off. .............. 96400916

[51] Int. Cl.$^6$ ...................................................... G06K 9/36
[52] U.S. Cl. .......................... 382/233; 382/173; 348/416
[58] Field of Search .................................. 382/173, 233, 382/236, 238, 239, 240, 242, 207; 348/409, 410, 411, 412, 413, 416, 420, 699

[56] References Cited

U.S. PATENT DOCUMENTS 5,164,828  11/1992  Tahara et al. .......................... 348/412
5,577,131  11/1996  Oddon .................................... 382/173
5,608,458   3/1997  Chen et al. ............................. 348/699
5,654,771   8/1997  Tekalp et al. .......................... 348/699

FOREIGN PATENT DOCUMENTS

0389044A2   9/1990  European Pat. Off. .
0627693A1  12/1994  European Pat. Off. .

OTHER PUBLICATIONS

M. Pardas et al "Joint Region & Motion Estimation with Morphological Tools" Workshop on Mathematical Morphology & it's Applications to Imag. Process. pp. 93–100, France, Sep. 1994.

Yairshoham "Efficient Bit Allocation for an Arbitrary Set of Anantizers" IEEE Trans. Aconst., Speech, Signal Process., vol. 36, pp. 1445–1453, Sep. 1988.

P. Salembier et al "Region–Based Video Coding Using Mathematical Morphology", Proceedings of IEEE, vol. 83, No. 61 pp. 843–857, Jun. 1995.

(List continued on next page.)

*Primary Examiner*—Amelia Au
*Assistant Examiner*—Samir Ahmed
*Attorney, Agent, or Firm*—Laurie E. Gathman

[57] ABSTRACT

The invention relates to a method and system for coding segmented pictures, and to corresponding decoding method and system. In the coding system, a first sub-system defines the time evolution of said segmented pictures, or partitions, and a second one encodes both contours and textures of the regions of the successive partitions. The time evolution definition leads to a partition tree (PT) from which regions are extracted during an analysis step (AS) in order to form a decision tree (DT). A decision operation allows to select during a choice step (CS) distinct regions $R_S$ from various levels of said partition tree, in order to construct an optimal final partition (BFP) and, simultaneously, to choose the coding technique (BCT) that is the best one for each region of said optimal partition. Reciprocally the decoding method and system comprise means for defining the coding strategy chosen for each of said regions and decoding correspondingly the coded information.

14 Claims, 10 Drawing Sheets

OTHER PUBLICATIONS

P. Salembier et al "Hierarchical Morphological Segmentation for Image Sequence Coding"., IEEE Trans. on Image Process., vol. 3, pp. 639–651, Sep. 1994.

"A VLSI Architecture For Hierarchical Motion Estimation" Allessandra Costa, Allessandro De Gloria, Paolo Faraboschi and Filippo Passaggio, IEEE Transactions On Consumer Electronics, vol. 41, No. 2, May 1995, pp. 248–257.

"Time Recursive Segmentation of Image Sequences", Signal Processing VII:Theories and Applications, Montse Pardas, Philippe Salembier, 1994 pp. 18–21.

"Best Wavelet Packet Bases in a Rate–Distortion Sense" Kannan Ramchandran and Martin Vetterli, IEEE Transactions On Image Processing, vol. 2, No. 2, Apr. 1993, pp. 160–175.

Motion and Region Overlapping Estimation For Segmentation Based Video Coding, Montse Pardas, Philippe Salembier, Benigno Gonzalez, IEEE Internation Conference On Image Processing, vol. 11, pp. 428–432.

"Coding of Arbitrarily Shaped Image Segments Based On a Generalized Orthogonal Transform", Michael Gilge, Thomas Engelhardt and Ralf Mehlan, Signal Processing: Image Communication 1 (1989) pp. 153–180.

SEGMENTED PICTURE CODING METHOD AND SYSTEM, AND CORRESPONDING DECODING METHOD AND SYSTEM

BACKGROUND OF THE INVENTION

The present invention relates to a method of coding segmented pictures, or partitions, that correspond to a sequence of original pictures and identify in said pictures contours and closed regions to which corresponding labels are associated, said method comprising a first definition step for defining the time motion evolution of the partitions between two successive pictures and a second coding step for coding motion, contours and textures of said regions of successive partitions, and to a corresponding coding system. The invention also relates to a signal coded by means of such a coding system, to a storage medium for storing this coded signal, to a method of decoding said coded signal, and to a corresponding decoding system.

A method and apparatus for decomposing a signal corresponding to an original picture into components using features (such as contours and regions) identified in said picture and then coding separately said components is described for instance in the european patent application EP 0389044. However such a conventional method of coding segmented pictures has no flexibility with respect to the type of segmentation that has be obtained or to the type of coding for the different areas of the original pictures. Particularly these method and apparatus are not an appropriate technical proposition as a possible solution for the elaboration of the MPEG4 (Moving Picture Experts Group) audio visual coding standard which targets interactive multimedia applications at low and very low bit rates (the limit of which is generally considered as equal or close to 1 Mbit/s.).

SUMMARY OF THE INVENTION

It is a first object of the invention to propose a coding method able to efficiently handle a partition-based representation of a scene, without any particular assumption about the scene content, its complexity or the image format (the scene can have an arbitrary number of objects with arbitrary relations, positions and motions), and particularly to be an adapted coding approach for addressing the various functionalities contemplated in the future standard MPEG4.

At this end, the invention concerns a coding method as described in the preamble of the description and in which, for each current partition considered with respect to the previous one, the first step comprises in cascade:

(1) a motion estimation and compensation sub-step, for the definition of a motion-compensated partition marking for each region coming from the previous partition the position of the core of this region in the current partition;

(2) a temporal extension sub-step of said regions previously defined by compensation in the current partition, for the definition of a so-called projected partition;

(3) a partition topology definition sub-step, for the determination, on the basis of motion and texture criteria, of additional partitions created either by merging or by re-segmenting regions of said projected partition, said additional partitions forming together with the projected one a partition tree;

(4) a decision sub-step, for the selection of the regions of an optimal partition within the proposals of regions contained in any level of said partition tree and of the best strategy for coding each region of said optimal partition, said successive optimal partitions constituting the sequence of the successive partitions to be coded, said second step then comprising, for the definition of the coded information that has to be transmitted and/or stored for each region of said partitions, a decision coding sub-step.

This method presents, from the viewpoint of the user, a very noticeable flexibility mainly based on an advantageous preprocessing of the image sequence. Moreover, the hierarchy of partitions that is proposed to the subsequent decision step and in which contours are preserved whatever the considered hierarchical level allows to deal with the final coding step in an optimal manner. The coding scheme is indeed able to accommodate very different situations and to lead to the best image representation for any given coding cost and whatever the set of available coding techniques.

In a particular embodiment, said coding method is characterized in that said motion estimation and compensation sub-step comprises a motion estimation operation, by way of a block matching method, and a motion compensation operation, by keeping from every region in the previous partition only its largest connected component marking with the same label as in the previous partition the position of the core of said region in the current partition, and said temporal extension sub-step comprises the implementation of a watershed lines method.

Moreover, according to the invention, it is advantageous that said decision sub-step comprises a first decision tree definition sub-step, for the selection of an optimal partition among the projected and additional partitions contained in said partition tree, and a second optimization sub-step, for taking a decision about the most appropriate coding strategy with respect to each region of said optimal partition, the second coding step being then provided for selecting for each region of the selected optimal partition the most appropriate texture coding method according to a predetermined criterion.

According to the coding philosophy of the proposed method, several texture coding techniques may be chosen. Preferably, said texture coding method to be applied to each region of said optimal partition is chosen within a list comprising the method of approximation by mean value, the polynomial approximation method, the shape adaptive discrete cosine transform method, and the dyadic bidimensional wavelet transform method.

Finally, in an improved implementation allowing to consider the case when the original regions are not homogeneous in gray level, said first step also comprises in cascade with the first ones the following additional sub-steps:

(1) before the motion estimation and compensation sub-step, an additional segmentation sub-step for segmenting the current partition, then called a coarse partition, until all regions are homogeneous according to a given criterion, said segmentation sub-step allowing to create a so-called dense partition;

(2) between the temporal extension sub-step and the partition topology definition sub-step, an additional merging sub-step for merging the projected regions of said dense partition, said merging sub-step allowing to define a so-called projected coarse partition, said additional segmentation being preferably a size-oriented one and the size parameter being then progressively decreased until a given homogeneity criterion referring to the gray level homogeneity of the pixels, such as the means squared error of the pixels with respect to the mean of the regions, is reached.

Another object of the invention is to propose a coding system allowing to implement said coding method. At this end, the invention concerns a system for coding segmented pictures, or partitions, that correspond to a sequence of original pictures and identify in said pictures contours and closed regions to which corresponding labels are associated, said system comprising a first time motion evolution defining sub-system and a second motion, contour and texture coding sub-system, in which the coded information to be transmitted and/or stored for each current partition comprises coded signals corresponding to an optimal partition composed either of regions of a main partition determined by a motion estimation and compensation of a previous partition or of regions of additional partitions created by merging or re-segmenting said regions of the main partition, said coded signals including the appropriate indications on the origin of each region, in the form of merging orders and splitting information.

According to a preferential implementation, the sub-systems of this coding system are organized in the following manner:

(I) said first sub-system comprises:
  (A) a first partition preprocessing sub-assembly, comprising:
    (1) a time evolution definition device, comprising:
      (a) a motion estimation circuit;
      (b) a motion compensation circuit;
      (c) a temporal extension circuit, the output of which constitutes a so-called projected partition defining said main partition;
    (2) a partition topology definition device, comprising:
      (d) at least a merging circuit;
      (e) at least a re-segmenting circuit;
the output of said partition topology definition device constituting a partition tree composed of said projected partition and of additional partitions created by said merging and re-segmenting circuits;
  (B) a second decision sub-assembly, comprising:
    (f) a decision tree construction circuit;
    (g) an optimization circuit;
the output of said decision sub-assembly constituting an optimal partition sent to said second coding sub-system, and said optimal partition being obtained by an association of regions from various levels of the partition tree;

(II) said second sub-system comprises:
  (C) a third coding sub-assembly, comprising:
    (4) a first decision coding device;
    (5) a second motion coding device;
    (6) a third contour coding device;
    (7) a fourth texture coding device;
    (8) a multiplexer of the coded output signals of said four coding devices.

In that implementation, said merging circuit may comprise a motion estimation stage and a merging proposition stage, and is followed by a second similar merging circuit, and so on, in order to build the upper levels of said partition tree by merging from the projected partition neighbouring regions which have a similar motion.

Whatever the implementation, the decision sub-assembly of this coding system is organized in such a manner that said decision tree construction circuit comprises a distortion computation stage, a rate computation stage and a memory, said memory being provided for storing in the form of a decision tree a list of distortions and a list of rates having both the same length as an associated list of texture coding methods in which a selection is made for the coding operation of the texture of each region of said partition tree, and said optimization circuit comprises a computing sub-stage, provided for making a local analysis of each node of said decision tree, and a decision sub-stage, provided for defining from the whole set of regions of the partition tree a final set of the regions that constitute said optimal partition to be coded.

A further object of the invention is also to define a coded signal such as generated by such a coding system, said coded signal consisting of a multiplexed signal comprising:

(A) a coded motion information, corresponding to the estimation of a motion model that characterizes the evolution of the segmentation between said successive partitions and allows to define a so-called projected partition;

(B) a coded partition information, corresponding to texture and contour information of each region of an optimal partition selected, on the basis of rate and distortion criteria, among all the regions of a hierarchy of additional finer and coarser partitions constructed from the projected partition corresponding to the current one;

(C) a coded decision information, corresponding to the coding strategy defined for each of said selected regions of the projected and additional partitions, according to the coding cost and quality associated to said rate and distortion criteria.

Another object of the invention is to propose a storage medium for storing said coded signal.

Another object of the invention is also to propose a decoding method able to be applied to a multiplexed coded bitstream as yielded at the output of the coding system implementing the previously described coding method. At this end, the invention concerns a method of decoding signals corresponding to segmented pictures, or partitions, that identify in an associated sequence of original pictures contours and closed regions to which corresponding labels are associated and having been previously coded by a coding method comprising a first step provided for defining, for each current partition considered with respect to the previous one, on the one hand a so-called projected partition obtained by motion estimation and compensation and a temporal extension of the compensated partition and on the other hand additional partitions created either by merging or re-segmenting regions of said projected partition, and for selecting an optimal partition composed of regions contained within the proposals contained in any level of the partition tree formed by said projected and additional partitions, and a second step provided for the definition of the coded information that has to be transmitted and/or stored for each region of each of the successive optimal partitions.

In accordance with the invention, said decoding method advantageously comprises a first decision decoding step, provided for defining which coding strategy has been previously used for each region of each optimal partition, a second motion decoding step, a third partition decoding step, and a fourth texture decoding step, and, preferably, said third partition decoding step comprises a first relabelling sub-step, provided for limiting the value of label numbers by reassigning a label value to each region, only labels 1 to N being used if there are N regions, a second merging sub-step, provided for performing the merging orders, a third intra regions decoding sub-step, a fourth motion-compensation and compensated errors decoding sub-step, and a decoded compensation errors partition labelling sub-step.

A further object of the invention is finally to propose a decoding system allowing to implement said decoding method. At this end, the invention concerns a system for decoding signals corresponding to segmented pictures, or partitions, that identify in an associated sequence of original pictures contours and closed regions to which corresponding labels are associated, said signals constituting for each current partition a coded information corresponding to an optimal partition composed either of regions of a main partition determined by a motion estimation and compensation of a previous partition and a temporal extension of the compensated partition or of regions of additional partitions created by merging or re-segmenting regions of the main partition, wherein said decoding system comprises an input buffer, provided for storing and demultiplexing said coded information, a decision decoding device, provided for decoding the information corresponding to the strategy used for coding said optimal partition, a motion decoding device, a partition decoding device, and a texture decoding device.

BRIEF DESCRIPTION OF THE DRAWINGS

These and other aspects of the invention will be apparent from and elucidated with reference to the embodiments described hereinafter and considered in connection with the accompanying drawings, in which.

DETAILED DESCRIPTION OF THE INVENTION

Figure 1:
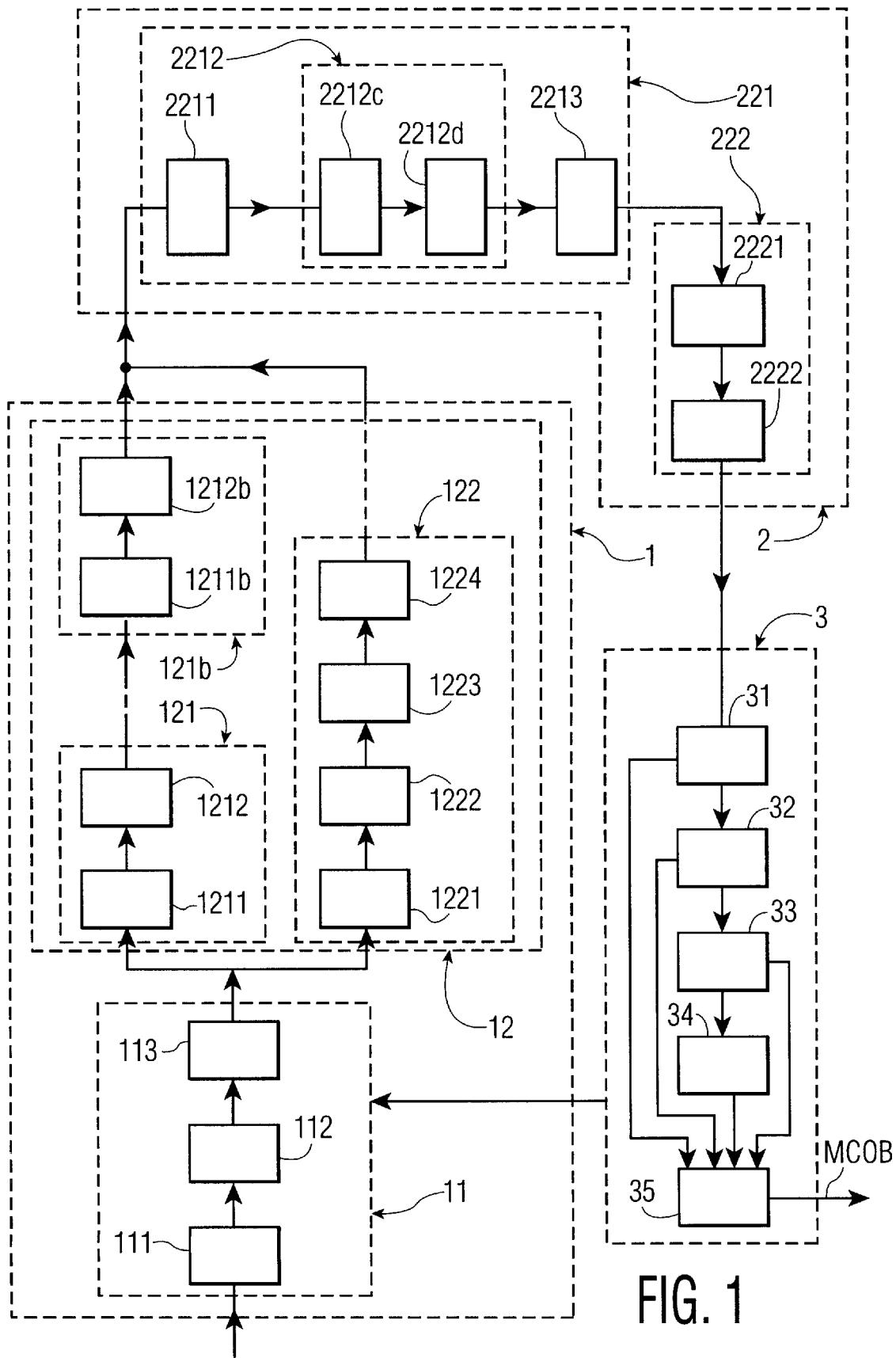
FIG. 1 is a general representation of a system according to the present invention and FIG. 2 illustrates the corresponding coding method.

Referring now to FIG. 1, there is illustrated a system comprising three main sub-assemblies. A first partition preprocessing sub-assembly 1, provided for receiving the incoming sequence of segmented frames or pictures S(t−j), . . . , S(t−1), S(t), S(t+1), . . . (that correspond themselves to original textured images P(t−j), . . . , P(t−1), P(t), P(t+1) . . . ), comprises a time evolution definition device 11 and a partition topology definition device 12. A second decision sub-assembly 2 is provided for receiving a set of partitions generated by said first sub-assembly 1 and defining a coding strategy. A third coding sub-assembly 3, provided for receiving said selected partition and the decision related to the coding strategy in connection with this selected partition, comprises a decision coding device 31, a motion coding device 32, a partition (or contour) coding device 33, a texture coding device 34, and a multiplexer 35.

Figure 2:
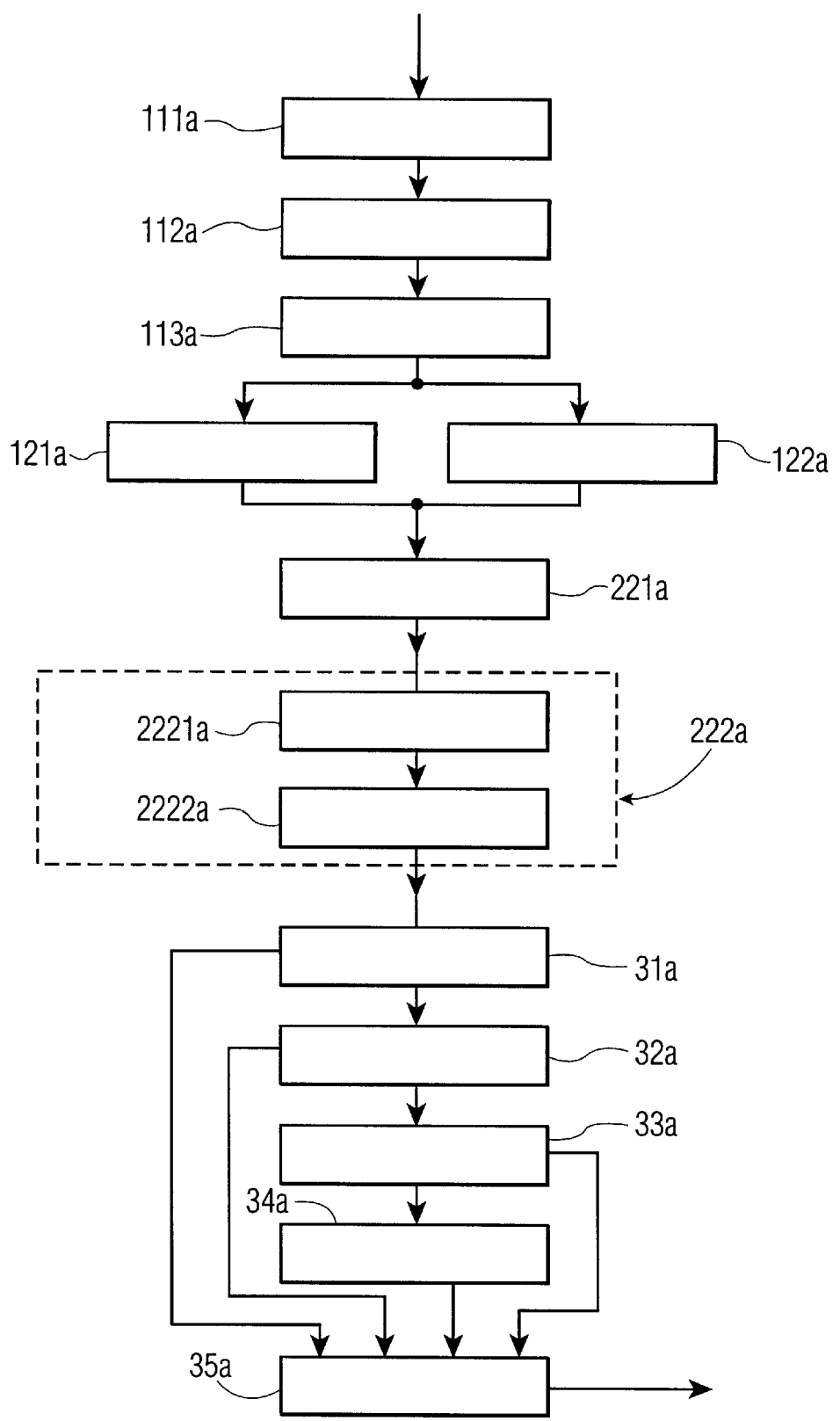

The general coding method that the previously cited sub-assemblies implement will now be explained with reference to FIG. 2 and in relation with FIG. 1. A time evolution definition sub-step, carried out in the device 11, is provided to follow the temporal evolution of the regions of the current partition. In the described example, in order to limit as much as possible both the processing delay and the computational load, only the previous coded picture or frame and its partition at time (t−1) are used to define the time evolution of the partition at time t. The time evolution definition substep is provided to adapt the partition of a previous frame (of the previous frame S(t−1) in the present case) to the current frame, this partition of the frame S(t−1) (t−i in a more general case) corresponding to the final partition which has been chosen for the previous picture (after a previous implementation of the coding method according to the invention, the output signals of the coding devices of the coding sub-assembly 3 are sent back to the first partition preprocessing sub-assembly 1). Said sub-step therefore accommodates the partition of S(t−1) to the data of the picture S(t), without introducing new regions. Such an adaptation of the partition of the previous frame is performed in three operations. First, a motion estimation operation 111a is carried out between the original frames S(t−1) and S(t). Then the previous partition is motion-compensated (operation 112a), and finally an extension operation 113a of the previous regions into the current frame is provided.

The first motion estimation operation 111a takes place in a motion estimation circuit 111. The motion is estimated between the preceding frame S(t−1) (a previous frame S(t−j) in the general case) and the next frame S(t) which is going to be segmented, according for instance to a block-matching process applied backwards. Such a technique is described for example in "A VLSI architecture for hierarchical motion estimation", IEEE Transactions on Consumer Electronics, vol. 41, n°2, May 1995, pp. 248–257: the frame S(t) is divided into small blocks of picture elements (usually 8×8 pixels for QCIF format of 176×144 pixels) and for each of them a search is conducted within a given window in the frame S(t−1) in order to locate in that frame a best matching block. The obtained motion information is a sufficient approximation even when the motion of some blocks involving more than one object is not strictly uniform. This motion information is given in the form of motion vectors respectively estimated for all the blocks of the considered frame.

The second motion compensation operation 112a is carried out in a motion compensation circuit 112, by applying the obtained motion vectors to the regions and in order to obtain as a final result a frame containing, for each region coming from the previous frame, a connected component with the same label as in said previous frame. Each of these components has been itself obtained in the following manner. If P(t−1) is the previous picture and S(t−1) its partition (or segmented frame, in the form of a set of labels), every pixel of the current frame will be covered (after the backward motion estimation) by one, and only one, pixel from the previous frame. It is obvious, however, that such a compensation can produce in each compensated partition small disconnected components, generally close to the contours of the regions. These disconnected parts could produce wrong extensions of the labels and have to be eliminated by way of a cleaning operation keeping from every region in P(t−1) only its largest connected component in the compensated partition P'(t−1) (this operation produces non labelled pixels in P'(t−1), but it does not involve any problem since this partition is only used as an initialization for the operation 113a that will follow the operation 112a). The motion compensated partition finally obtained, in which there is at most one connected component per region of P(t−1), marks for each region coming from the previous frame the position of the core of this region in the current frame.

Figure 3:
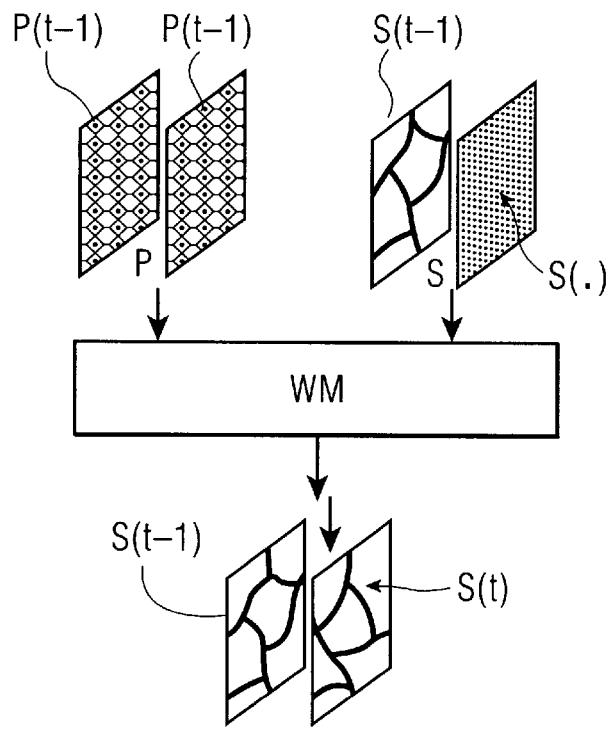
FIG. 3 illustrates a time extension operation of the regions.

The third extension operation 113a is implemented in a temporal extension circuit 113, in order to define the boundaries of the regions thus projected from the motion compensated partition. Such an extension of a compensated partition in a current frame can be performed for instance by using the conventional morphological tool called watershed lines method and described for example in the communication "Time-Recursive Segmentation of Image Sequences", M. Pardàs and P. Salembier, EUSIPCO 94, VIIth European Signal Processing Conference, Edinburgh (United Kingdom), Sep. 13, 1994. The above obtained connected components constitute thanks to their specific label identifying the presence of homogeneous regions a set of markers defining the core of the regions which are going to be extracted. As described in the cited document and after having recalled (with reference to FIG. 3) that P(t−1) and P(t) are the pictures at times (t−1) and t, and that S(t−1) and S(t) are respectively the already known partition (at time t−1) and the unknown partition (at time t) that has to be determined, two three-dimensional signals are constructed by grouping together the pictures P(t−1) and P(t) to form a temporal block P of size 2 in the temporal dimension and similarly grouping (in order to form a block S considered as the set of markers that should be used to segment the block P) the partition S(t−1) and an empty frame S(.) representing a frame of uncertainty. Such a frame is so called because the pixels of this frame do not yet correspond to a given marker.

The implementation of the watershed lines method WM results in a growing process in which these pixels are assigned to a given marker until the markers occupy all the available space of the empty frame, each pixel being assigned to a specific region because it is in the neighbourhood of the marker of this region and is more similar (in the sense defined by a specific criterion) to the area defined by this marker than to any other area corresponding to another marker in its neighbourhood. A possible similarity criterion may be for example the gray tone difference D between the pixel under consideration and the mean of the pixels that have already been assigned to this region, or also a modified criterion introducing a weighting factor "Alpha". This last solution allows now to consider no longer D alone but the weighted sum (Alpha×D)+(1−Alpha)C, where C is a penalty term corresponding to a contour complexity obtained for instance by counting the number of contour points that are added if the considered pixel is assigned to a particular region, and therefore to give more or less importance to the gray level measure or to the contour complexity.

A projected partition PJ(t) is therefore available when the third operation 113a is completed. From this projected partition a partition tree will be built for providing (using motion and texture criteria) different partitions among which the second decision sub-assembly 2 will later select for coding the picture the most convenient regions, constituting a final partition composed of regions issued from the different levels of the partition tree. This building process is carried out in the partition topology definition device 12, the aim of which is in fact to create from the projected partition two different kinds of partitions (by a procedure which is purely intra):

partitions which are created by merging regions from the projected partition and which define the upper levels of the partition tree: this merging, based on a motion criterion as it will be explained, allows to obtain greater regions grouping neighbouring regions that have a similar motion (the internal contours between these neighbouring regions need no longer to be coded);

partitions which are created by re-segmenting the projected partition (providing the possibility of obtaining in the current partition new regions which were not present in the previous one) and which define the lower levels of the partition tree: the reasons for obtaining these new regions may be the introduction of new objects in the scene (their texture is generally different from that of the neighbouring objects) and or the fact that two regions characterized by a very different texture but merged because they have a similar motion in a previous frame can suddenly differ in their motion in the current frame, thus leading to a too large compensation error if they continue to be coded using the same motion parameters.

The partition topology definition sub-step thus carried out by the device 12 is performed in two operations: first a merging operation 121a (at least one), secondly a re-segmentation operation 122a (at least one).

Figure 4:
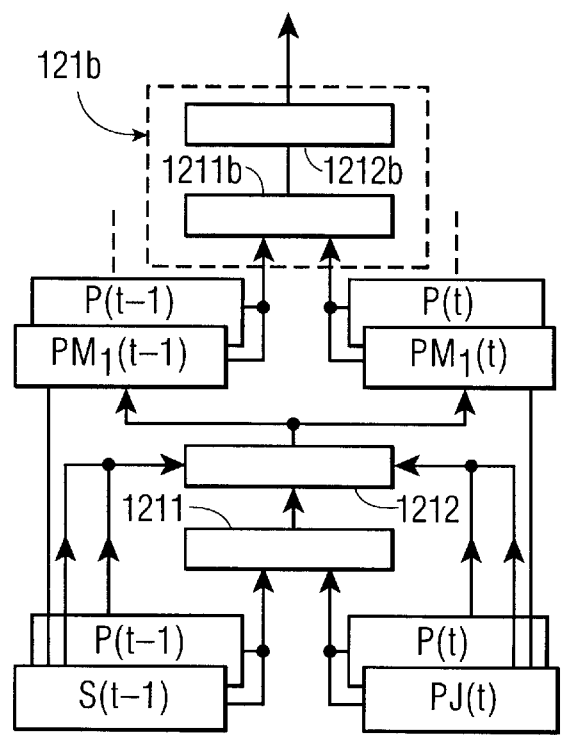
FIG. 4 illustrates a merging operation.

The merging operation 121a takes place in a (first) merging circuit 121. Referring to FIG. 4, this circuit 121, the aim of which is to merge neighbouring regions which have a similar motion, comprises a motion estimation stage 1211 and a merging proposition stage 1212. Given the two original textured pictures P(t−1) and P(t) and the partition S(t−1), the stage 1211 is provided for computing the motion parameters of the projected partition PJ(t) yielded by the device 11. This motion estimation process returns for each region of the projected partition a set of motion parameters describing the motion of said region between (t−1) and t. The motion estimation step implemented in the stage 1211 may for instance be of the type described in the french patent application N° 9604194 filed on Apr. 3, 1996, the content of which is recalled in the annex A, at the end of the present description, with reference to FIGS. 12 to 15.

Once the motion parameters of the projected partition are known, the estimation of the cost of merging neighbouring regions is carried out in the merging proposition stage 1212. For every couple of neighbouring regions, a merging cost is computed, and a required number of merging opportunities is obtained by selecting the couples of neighbouring regions with the smallest merging costs, on the basis of a merging criterion. For instance, two neighbouring regions should be merged if the cost of coding the prediction error produced when these regions are considered as a single one (i.e., when they are motion compensated with the same set of motion parameters) is smaller than the cost of coding the contour located between them. In fact, as the coding method is not yet known, the criterion is slightly modified. The compensation error (and no longer the precise coding cost) produced by the merging is taken into account: more precisely, the cost which is considered is the increase of the mean square compensation error in the merged region with respect to the mean square compensation error when the two regions are compensated separately (in order to simplify the computations, the new motion parameters corresponding to the merged regions are not computed: the compensation error produced when merging two regions is computed using only one of the two sets of already known motion parameters corresponding to the two regions, the one which produces the smaller compensation error). In the case of intra frames, the motion is not taken into account for proposing the merging. As the coding does not use any motion information, the merging option is then proposed on a texture basis, the costs being computed by taking into account the difference of the mean gray level value of the neighbouring regions.

As already said, the coding method is not yet known. The actual decision of merging two regions in terms of coding cost will be definitively taken later, in the decision sub-assembly 2, and several merging proposals may be produced at each level. As the final merging procedure must be iterated for each level in the partition tree, a merging is however produced and applied as illustrated in FIG. 4 both on the current projected partition and on the partition of the previous image, leading to merged partitions PM1(t−1) and PM1(t), which constitute the further inputs for a possible repetition of the procedure in a second merging circuit 121b (a further motion estimation in another motion estimation stage 1211b, a further merging proposition in another merging proposition stage 1212b), and so on for the whole set of upper levels of the partition tree.

Figure 5:
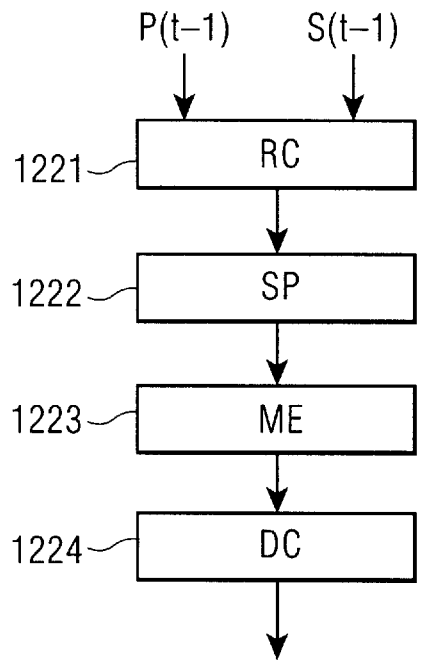
FIG. 5 illustrates a re-segmentation operation.

In the re-segmentation operation 122a, which takes place in a re-segmenting circuit 122 and must be carried either when new objects appear or when two regions suddenly adopt divergent motions, one needs to separate regions with unhomogeneous texture. This re-segmentation procedure will therefore be based on a texture criterion. It may be implemented for instance with a hierarchical structure starting from the projected partition and which progressively introduces new regions in the partition at every level without modifying the contours of the previous levels. This re-segmentation procedure is composed of four steps carried out in corresponding stages: a residue computation stage 1221, a simplification stage 1222, a marker extraction stage 1223, and a decision stage 1224. As illustrated in FIG. 5, these stages are also respectively designated by the references RC, SP, ME and DC.

Knowing that each level has to improve the segmentation of the previous level by introducing new significant regions, each region of the projected partition is filled with its mean gray level value or with a gray level function such as a polynomial one. A residue is obtained (in the stage 1221) as the difference between the original picture P(t−1) and the modelled one, the partition S(t−1). An example of such a residue computation by image modelling is for instance described in the european patent application EP 0627693. The other operations (the simplification, carried out in order to make the partition easier to segment; the marker extraction, carried out in order to detect the presence of homogeneous regions and further identify their core by labelling of specific zones; the decision, taken in order to deal with the uncertainty areas which have not yet been assigned to any region and correspond to pixels around the region contours) are described in the already cited document "Time-Recursive Segmentation . . . ", EUSIPCO 94. As for the merging operation, the procedure may be repeated in an iterative manner, a size criterion being used for all the re-segmentation levels except the last one for which a contrast criterion is used (at each level of this iterative procedure, the only difference is the simplification intensity which is decreased in order to progressively introduce small or low-contrasted regions). Once merging and re-segmentation have been performed, a motion refinement as described in the cited patent application EP 0627693 is applied for each region of all the partition levels.

As can be seen when the building process in the partition topology definition device 12 is achieved, a partition tree defining a set of possible regions issued from the projected partition has been obtained. The operations which have been implemented in that device 12 are simply provided in order to obtain a proposal which defines the contours of possible new regions, without having taken any decision concerning the actual partition to be coded. As the objective of this device was to define a set of regions being a part of the optimal partition, on the one hand this set should be reduced in order to limit the computational complexity of the decision which will be taken afterwards, but on the other hand the partition proposals should be carefully created in order to allow an efficient decision.

The partition tree being now available and having provided different partitions on the basis of motion and texture criteria, from these partitions the decision sub-assembly 2 will select the most suited regions for coding the original picture, the chosen final partition being in fact composed of regions issued from the different levels of the partition tree (the contours of the original projected partition being never modified). The objective of this sub-assembly 2 is to define the coding strategy by implementing a decision sub-step in which two successive parts can be distinguished: first a selection of the optimal partition within the proposals contained in the partition tree, secondly a decision about the best strategy for coding each region of this resulting partition.

Figure 6:
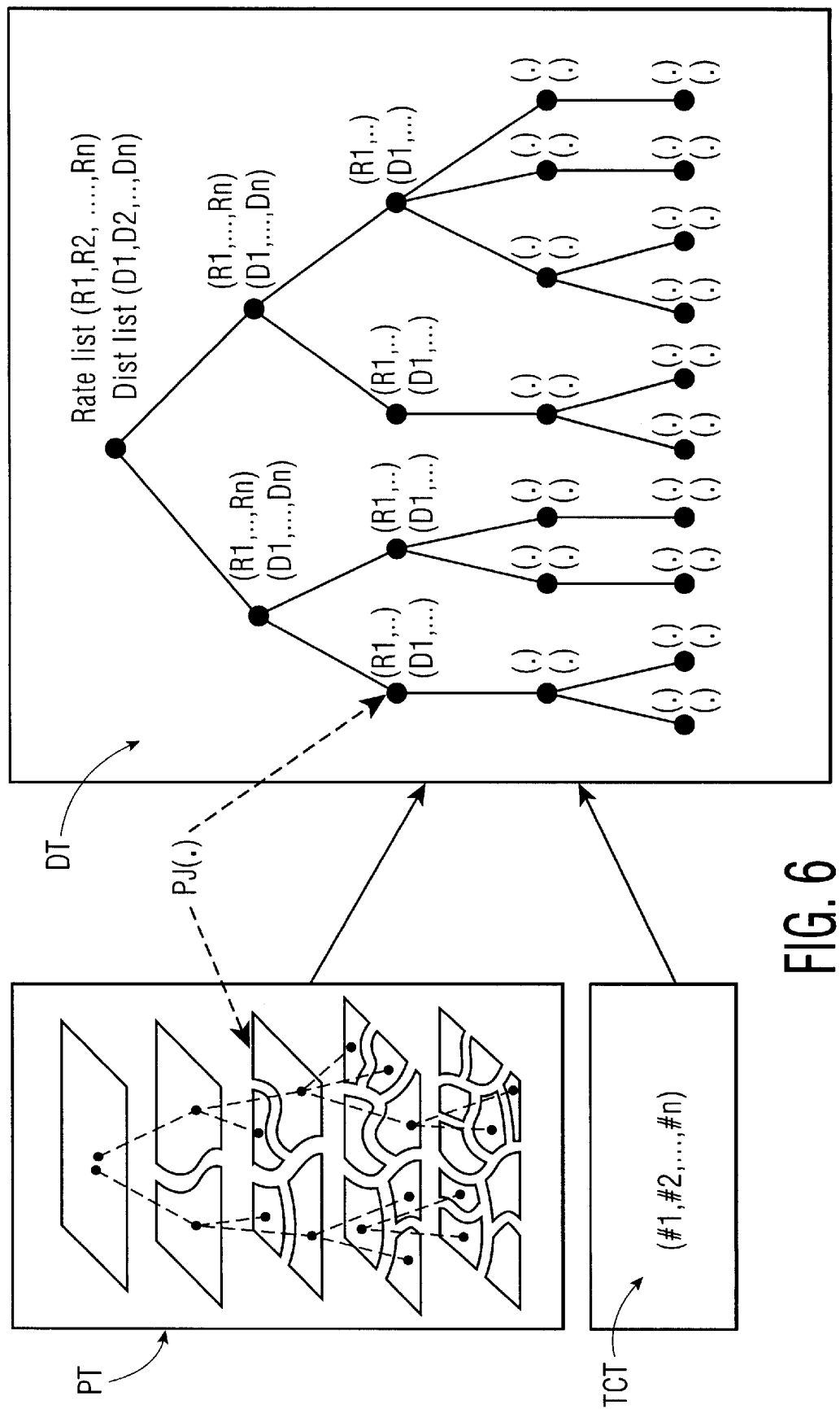
FIG. 6 illustrates a decision tree construction operation.

This decision sub-step relies therefore on two operations consisting in a first decision tree definition operation 221a followed by a second optimization operation 222a. The first operation 221a takes place in a decision tree construction circuit 221. As illustrated in FIG. 6, from the partition tree PT which was defining the choices in terms of regions (dotted lines indicate merged or re-segmented regions associated to original regions of the projected partition PJ(.), only four in FIG. 6 for sake of simplicity of the illustration), a decision tree DT, concentrating in a hierarchical structure all the possible coding choices, is deduced in the following way: each node of the decision tree corresponds to a region in the partition tree, with relations between nodes (between father nodes and children nodes) which are also given by the partition tree. These relations define how one region at a given level (in FIG. 6, five levels including the level of the projected partition PJ(.) are shown) may either be split into various regions (or children regions) or be merged to form a larger region (or father region). Moreover, in order to define the coding strategy (in a rate-distortion sense), the decision tree will convey information about coding costs and respective quality (or distortion) of the n possible texture coding techniques: a list of rates (rate list $R_1, R_2, \ldots, R_n$) and a list of distortions (dist list $D_1, D_2, \ldots, D_n$) will therefore be assigned to each of said nodes, both lists having the same length as the list of texture coding techniques TCT, and each of these n techniques being in FIG. 6 designated in a short manner by #1, #2 . . . , . . . , #n. In practice, each region of the partition tree is coded (either in intra or in inter mode since the motion of each region has been estimated during the creation of the partition tree) by all the proposed techniques, and the corresponding rate and distortion are stored in the decision tree.

This step of construction of the decision tree in the circuit 221 is therefore simply an operation of evaluation of the respective merits of each technique, no decision being taken at that moment. This circuit 221 comprises a distortion computation stage 2211, a rate computation stage 2212 and a memory 2213. In the stage 2211, one has used the mean squared error criterion in the luminance and chrominance, because it is an additive criterion (as will be seen, the optimization operation which follows the decision tree definition operation requires the distortion measure to be additive: if a region A is segmented into various regions $B_j$, the distortion measured on A would be equal to the sum of the distortions measured on all $B_j$). In the stage 2212, the objective is to compute rates which give the global coding costs of the regions. The rate is mainly made of three components for each region:

- cost of texture coding: it can generally be easily estimated by measuring the entropy of the coefficients, in a sub-stage 2212c;
- cost of motion parameters coding: it is also given by an entropy estimation of the model parameters, in a sub-stage 2212d;
- cost of partition coding.

This last case of the cost of partition coding is more complex, because the shape and the position information are not coded separately for each region. The whole partition being coded in a global way, it is therefore not straightforward to estimate the contribution of a given region to the partition bitstream. It has therefore been chosen to consider that a reasonable estimate of the partition cost of the region is proportional to the perimeter of said region, the proportionality factor depending on whether the region will be compensated or not: according to the fact that the texture coding is carried out in intra mode or in inter mode, the partition cost is here assumed to be equal either to 1, 3 or 0,7 bit per contour point.

Figure 7:
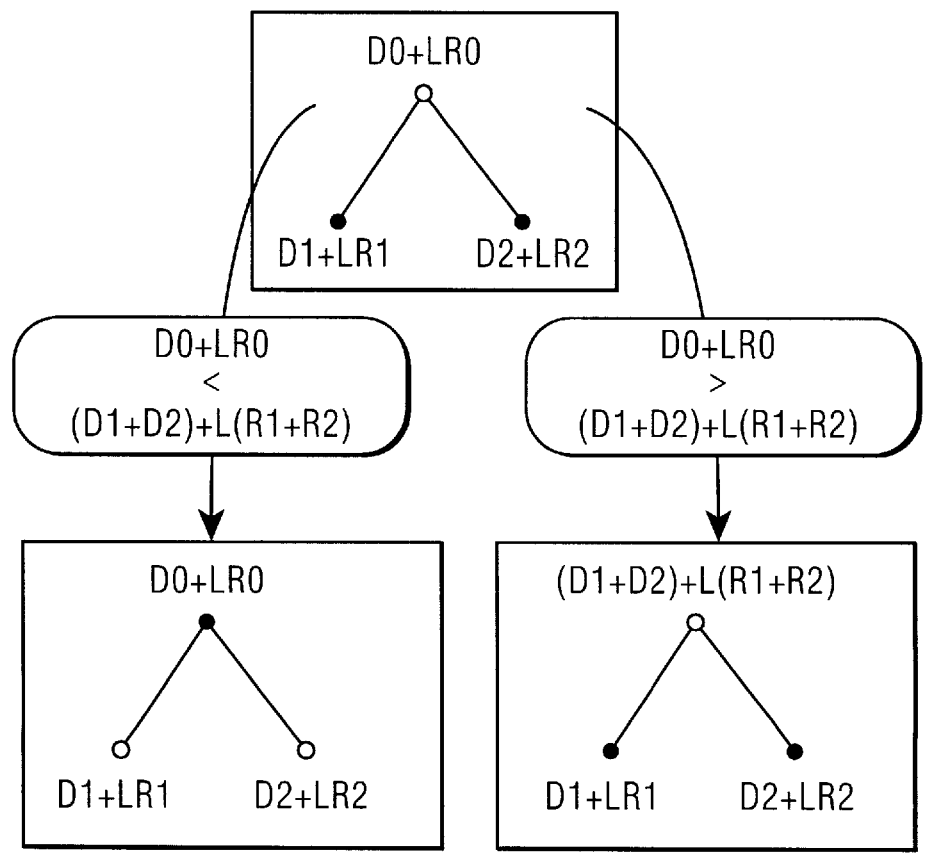
FIG. 7 illustrates how local decisions on the coding strategy are taken.

Once all the nodes of the decision tree have been populated with the lists of computed rates and distortions, the actual optimization operation 222a can start in an optimization circuit 222. This problem of optimization can be formulated as the search for a minimization of the distortion D of the image (as described for instance in the article "Best Wavelet Packet Bases in a Rate-Distortion Sense", K. Ramchandran and M. Vetterli, IEEE Transactions on Image Processing, vol. 2, n°2, April 1993, pp. 160–175), with the restriction that the total cost $R_t$ must be below a given budget defined for each frame, which can be reformulated as the minimization of the Lagrangian $D+LR_t$ where L is the so-called Lagrange parameter (both formulated problems have the same solution if one finds $L_o$ such that $R_t$ is equal or very close to the budget). This problem finally consists in using the decision tree in order to find a set of regions (creating a partition) and a set of texture coding techniques minimizing $D+L_oR_t$. To this end, the optimization operation 222a comprises the following sub-steps:

- the first sub-step 2221a, carried out in a computing sub-stage 2221, allows to make a local analysis and to compute, for each node of the decision tree, the Lagrangian for each texture coding technique: the technique giving the lowest one is considered as the optimum one for this node and this Lagrangian is stored;
- the second sub-step 2222a, carried out in a decision sub-stage 2222, allows to define the best partition by a bottom-up analysis of the decision tree which, starting from the lowest level, leads to a set of local decisions on the coding strategy, as illustrated in FIG. 7: assuming that the two nodes on said lower level are active (which means that they are considered as being part of the final partition: such nodes are represented by black circles), two situations may occur when one likes to know if it is not better to code the area represented by these two regions as a single region represented by the single node located on the upper level:
  - (a) if the Lagrangian of the upper node $(D_o+LR_o)$ is lower than the sum of the Lagrangians of the lower level, it is actually better to code the area as a single region, and the upper node becomes active in place of the two lower nodes which are deactivated (left side of FIG. 7);
  - (b) if the Lagrangian of the upper node is higher than said sum, it is better to code the area as two regions, and the upper node remains deactivated (right side of FIG. 7) while its new Lagrangian is the sum of the Lagrangians of the nodes at the lower level (it may be recalled that the additivity in rate and distortion has been assumed during the whole optimization operation).

This procedure is iterated until the highest level of the decision tree is reached. The set of activated nodes then gives the final set of regions which defines the optimal partition. If the coding cost, computed by adding the rates of the best techniques for all activated nodes, is equal or very close to the budget, the optimization procedure is finished and this optimal partition will be coded. If the coding cost is much below or above the budget, the Lagrange parameter L has to be modified and the optimization has to be done again. The convenient definition of L can be done with a gradient search algorithm starting with a very high value $L_H$ and a very low value $L_L$ leading to two corresponding coding strategies which give rates $R_H$ and $R_L$ respectively below and above the budget. Except if one of these rates is already close enough to the budget, a new Lagrange parameter is defined as $L=(D_H-D_L)/(R_H-R_L)$ and the procedure is iterated until one strategy giving a rate close to the budget is found (for instance falling within an interval of 5% around it).

Figure 8:
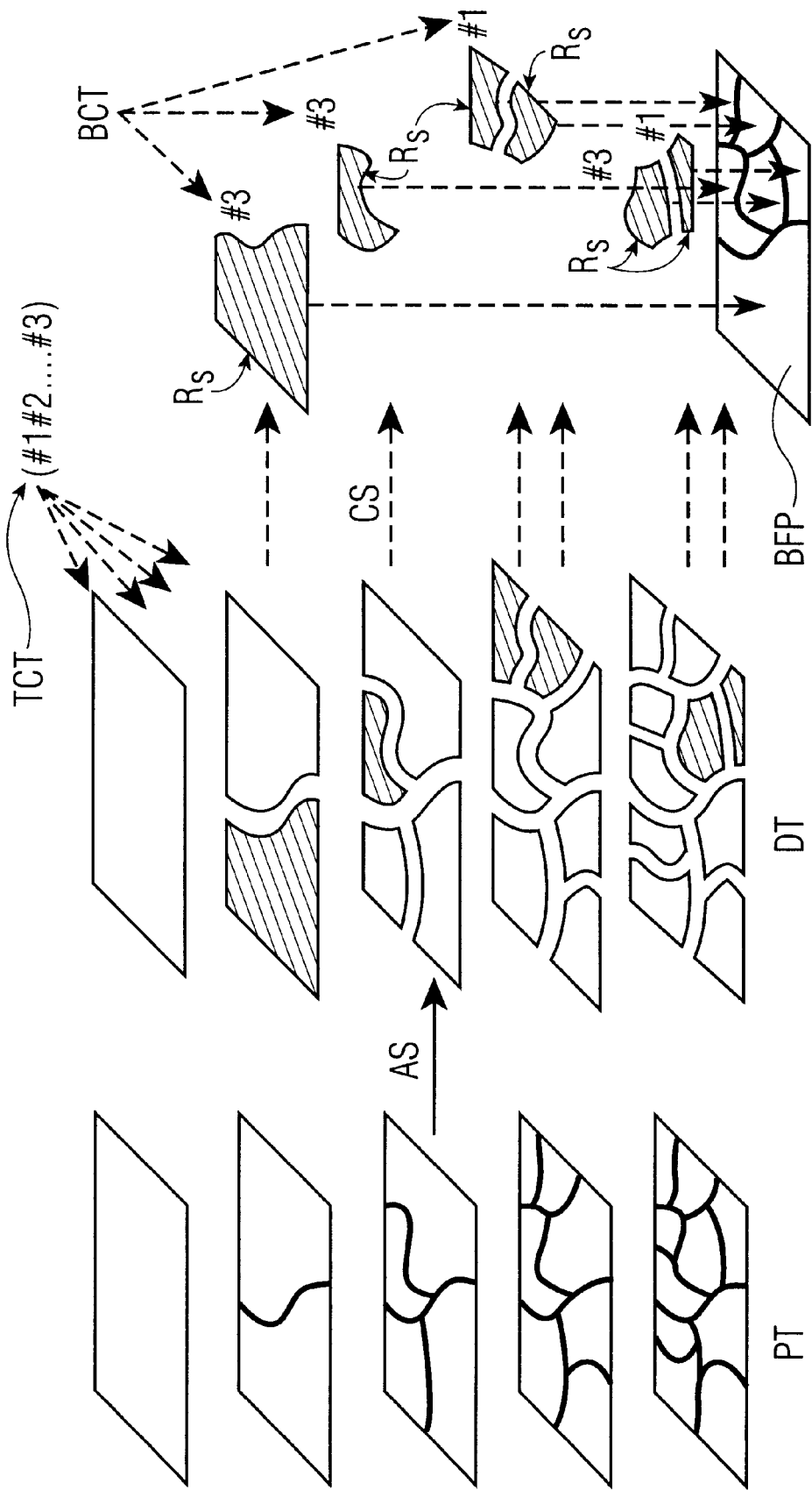
FIG. 8 illustrates the decision process implemented in order to lead to an optimal partition.

An illustration of the whole decision sub-step, as implemented in the device 22, is given in FIG. 8. From the partition tree PT, all regions are extracted (analysis step AS) to form the decision tree DT, and several texture coding techniques, indicated by the reference TCT (their number has been previously called n), are considered for each region. Then regions $R_S$ from various levels of the partition tree are chosen (choice step CS), and the best final partition BFP (or optimal partition) is defined together with the best coding techniques BCT, one for each region.

Once this optimal partition, created from the proposals contained in the partition tree, and the coding strategy for each region have been defined, the information necessary to decode the image sequence should be sent to a receiver (or to a storage medium, the decoding process being then implemented later). This information, processed in the third coding sub-assembly 3, is composed of:

- (a) the coding strategy itself: this information, coded in the decision coding device 31, will inform the receiving part (the receiver or the storage medium) about the coding technique to be applied on each region;
- (b) the motion parameters for the regions which have to be compensated: for all regions coded in inter mode, a set of motion parameters, coded in the motion coding device 32, is sent to the receiver, for instance according to a polynomial motion model allowing to deal with motions such as combination of translations, zooms, pans and rotations;
- (c) the partition: the partition coding device 33 produces all the information needed by the receiving part for restoring the current partition, that is to say the position of each region and its contour, an identification number (or label) being also transmitted for each region in order to track the regions in time and to deal with areas uncovered by the motion compensation;

(d) the texture parameters of each region: the texture may be coded in the texture coding device 34 by using a very large number of region-based coding schemes (in the present case, one may use coding techniques such as region-based wavelets decomposition, shape-adaptive direct cosine transform, or decomposition on orthonormal bases).

Concerning the decision coding device 31, it must be noted that the final partition is the partition which has to be coded and transmitted (and/or stored). In order to help the coding process, the device 31 will therefore give to the receiving part some information about the origin of each region. The regions belonging to the final partition may come either from the projected partition (projected regions) or from the levels of the partition tree located above the projected partition (merged regions) or below it (re-segmented regions). For the projected regions, the label is simply the label as defined by the projection. For merged and segmented regions, which are all new regions with new labels, the texture should be always sent in intra mode. To avoid this situation, the device 31 sends to the receiving part the practical history of the partition and the transformation of the regions, i.e. the merging orders and the splitting information. The merging orders are a set of numbers indicating that, for example, a region X at time t has been created by an union of regions xi at time (t−1), in order to allow that the receiving part applies the same merging process to the regions $x_i$ of the previously coded partition (since the partition coding relies on motion compensation, the merging orders will also be useful for the coding of the partitions: before motion compensating the previous coded partition, its regions will be merged according to the instructions contained in the merging orders). The splitting information is not an order implying some specific transformation, it simply indicates that the set of regions $x_i$ of the partition at time t comes from a given region X at time (t−1), the pixels of which are allowed to predict all pixels of all regions $x_i$ during the texture compensation.

Concerning the motion coding device 32, it must be recalled that, in order to have an efficient representation, the partition and the texture have to be compensated. This motion compensation, the aim of which is to build the best possible motion predicted picture from the last coded picture (knowing the available segmentation and the motion information) is useful both during the coding process and the decoding process and has therefore to be coded and transmitted. It uses as only information the last coded picture, the motion parameters associated to each region of the current partition and the current partition itself. Each region of the partition having motion parameters is predicted as described in the french patent application N° 9604194 already cited (the regions known as intra regions do not have, of course, to be predicted: in practice, for the further processing, they are identified by a particular label put in the compensated picture), this operation being performed on the three components (luminance: Y, chrominance: U and V) of the last coded picture to obtain the final Y-U-V motion compensated pictures. Concerning the partition coding device 33, it must be recalled: (a) that the previous motion estimation has led, for describing the time evolution of the regions, to only one motion model for each region (to only one vector per region if the motion model is a translation, or to a set of vectors, one for each pixel, if the motion model is more complex); (b) that the compensation carried out with these vectors can work either in a forward mode or in a backward mode (the main difference between these modes concerns the quantization of the pixel locations: as the motion vectors start from an integer pixel location but point to a non-integer one, the locations of the pixels of the current reconstructed partition have to be quantized in the forward case, whereas in the backward case, the locations of the pixels of the previously reconstructed partition are quantized); and (c) that one must define which kind of information can be used to compensate the partition.

Indeed, a distinction has to be made between the motion of the pixels inside a region (texture motion) and the motion of its shape. Both motions coincide in the case of a rigid foreground region, but not for a background region because the modifications of its shape or of its contours are defined by the motion of the regions in its foreground. The communication "Motion and region overlapping estimation for segmentation-based video coding" of M. Pardàs, P. Salembier and B. González, IEEE International Conference on Image Processing, Austin, Tex. (USA), November 1994, volume II, pp. 428–432, describes an object-based video coding system in which it is indeed avoided to perform two different motion estimations for the background regions. The motion estimation for contours is replaced by an extra information called order relation between regions and which allows to know for every couple of neighbouring regions which of them is on the foreground (to this end one performs for instance for every boundary between two neighbouring regions a two hypothesis test consisting in calculating the prediction error in each region for the two possible order relations and selecting the order that yields the lowest one), and this order information is associated to the texture motion in order to compensate both the partition and the texture (obviously, the order is also used in the receiving part in order to solve the possible local conflicts between compensated labels).

Figure 16:
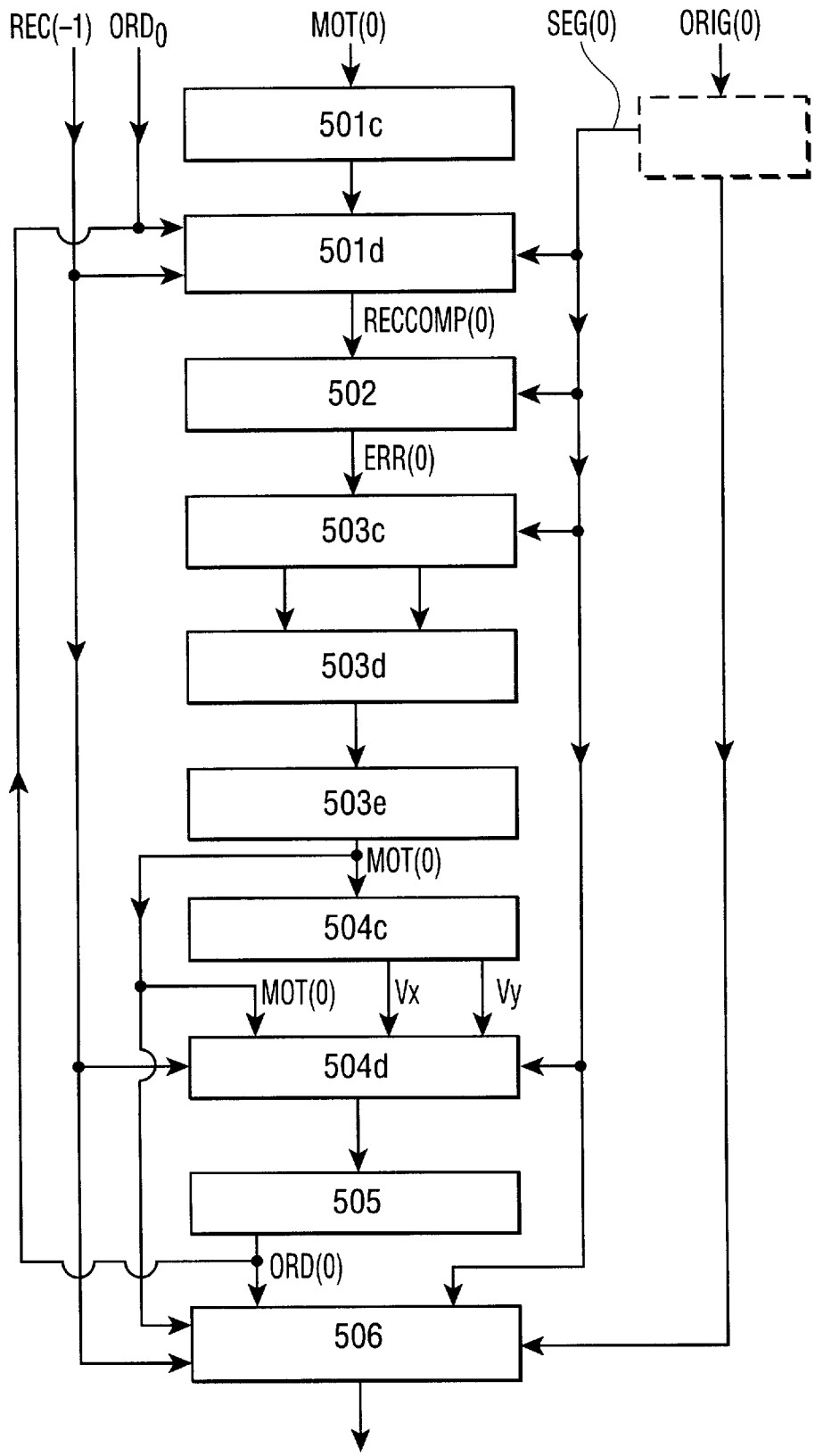
FIG. 16 is an illustration of a coding method with a specific type of order estimation.

Once the order has be estimated either by the above-given method or according to an option such as the technical solution described in the european patent application N° 95401813.1 (filed on Aug. 2, 1995) and recalled at the end of this description, in the annex B, with reference to FIG. 16, the partition coding device 33 can be activated.

Concerning the texture coding device 34, provided in order to encode the gray-level or colour information inside each region of the partition, several texture coding methods are possible in order, as already said, to give to the whole coding device according to the invention some flexibility. A first one, called approximation by the mean value, consists of transmitting only the mean value of the pixels belonging to each region. Another one, called polynomial approximation onto orthogonal basis and described for instance in "Coding of arbitrarily shaped image segments based on a generalized orthogonal transform", M. Gilge and al, Signal Processing: Image Communication, vol. 1, n°2, October 1989, pp. 153–180, relies on an approximation of the texture within each region by an orthogonal polynomial function, only the coefficients of this function being sent to the receiving part.

A third method, called shape adaptive DCT (discrete cosine transform), consists of splitting each region into blocks (of size 8×8 pixels for instance) and to perform a conventional DCT on the blocks which belong to the region: the pixels being first ordered in vectors, horizontal and vertical DCT are then performed independently on each vector (the order of the monodimensional DCT is equal to the length of the vector), and the obtained coefficients are quantized and transmitted.

A fourth texture coding method, the dyadic bidimensional wavelet transform, allows the concerned signal to be described by a set of subband signals, each of which represents the input signal at a given resolution level and in a particular frequency range. Wavelets are usually applied to blocks or images, but this application is now extended to region-based schemes, each region being treated independently (the filtering and downsampling of the image at each level of the multiresolution analysis are performed independently on each region).

Finally the output signals of the devices 31 to 34 are sent to a multiplexer 35, the output of which constitutes the multiplexed coded output bitstream MCOB sent to the receiving system (and/or stored).

It must indeed be underlined that the invention also relates to a coded signal as defined at the output of the described coding system. This coded signal, not necessarily transmitted immediately and then stored in order to be transmitted later, or transmitted but not used immediately at the reception side and therefore stored, corresponds in the present case, with respect to the considered sequence of segmented pictures, to each region of the current partition of this sequence and consists of a multiplexed signal comprising several kinds of information: a motion information, corresponding to the estimation of a motion model that characterizes the evolution of the segmentation between successive partitions and defines the projected partition, a partition information, corresponding to the texture and contour information of each region of the selected optimal partition, and a decision information, corresponding to the coding strategy defined for each of the selected regions of this optimal partition. As said above, such a coded signal may be stored, and consequently the invention also relates to the storage medium on which this signal is stored.

Figure 9:
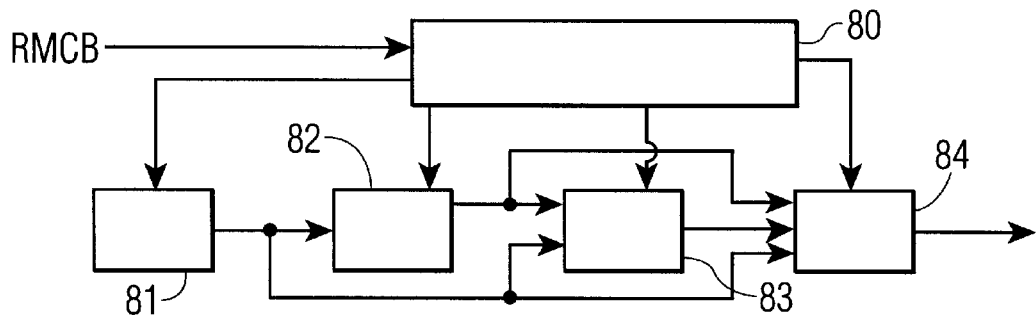
FIG. 9 is a schematic representation of the structure of the decoding device and illustrates the corresponding decoding method.

Moreover the invention is not limited to the previous embodiments and further relates to a method of decoding such a coded signal, allowing to reconstruct decoded pictures, and to a corresponding system described with reference to FIGS. 9 to 11. The received multiplexed coded bitstream RMCB (corresponding to the bitstream MCOB sent through the transmission channel and/or towards the receiving part and/or the storage medium) is first received (see FIG. 9) by an input buffer 80, and then sent to a decision decoding device 81, followed in series by a motion decoding device 82, a partition decoding device 83, and a texture decoding device 84, the output of which constitutes both the output decoded signal of the decoding system and a further input (not shown in FIG. 9) of the partition decoding device 83 (these main four decoding steps correspond to the four coding devices of the coding sub-assembly 3 of FIG. 1). First the coding strategy information and the motion are decoded in the devices 81 and 82. Then the partition and the texture information are successively decoded in devices 83 and 84 respectively, according to FIG. 10, illustrating the loop which allows to understand the decoding process, and to FIG. 11, which shows in greater detail the partition decoding device 83.

Concerning the partition decoding device 83, it receives (see FIGS. 10 and 11) on the one hand the output signals of the buffer 80 storing the transmitted coded signals and on the other hand the previously decoded and reconstructed partition, called REC(t−1) and available in the form of a list of labels at the output of the texture decoding device 84. Said device 83 implements the following successive steps, as illustrated in FIG. 11.

Figure 10:
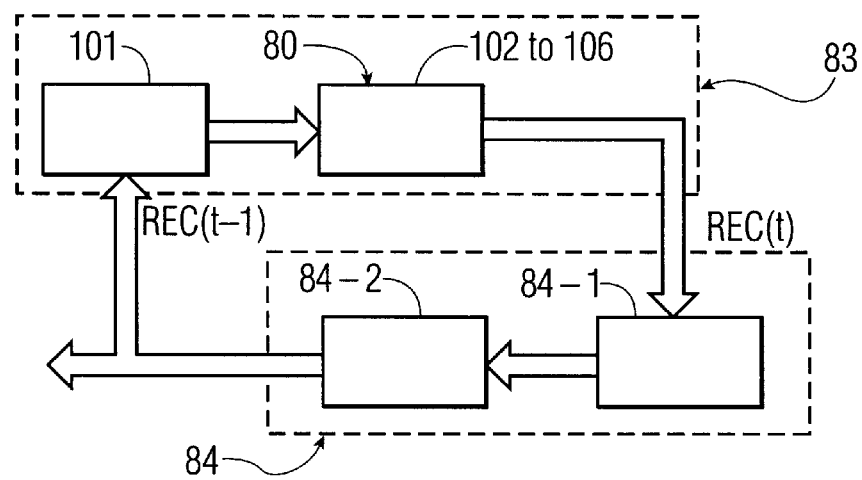
FIG. 10 is a diagram giving a more detailed illustration of the partition and texture decoding process.
Figure 11:
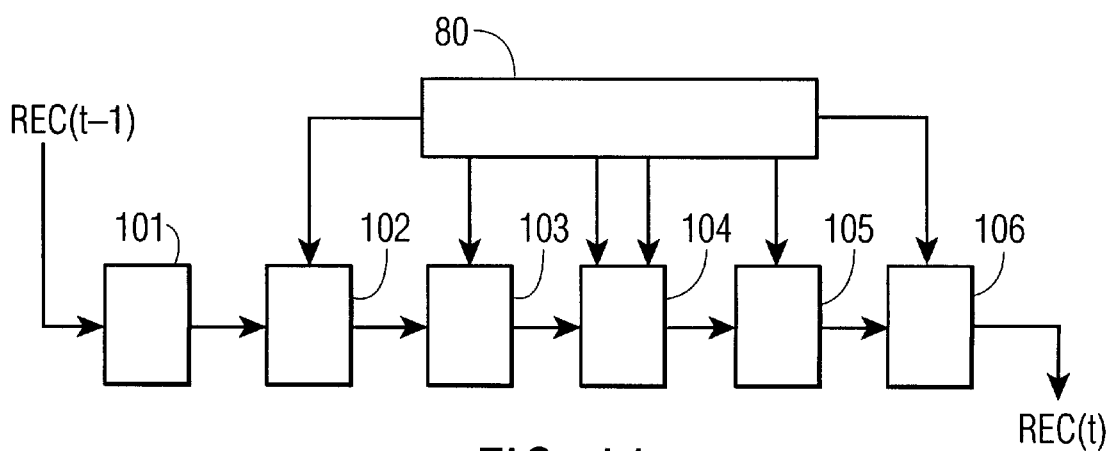
FIG. 11 is an embodiment of the partition decoding device.
Figure 12:
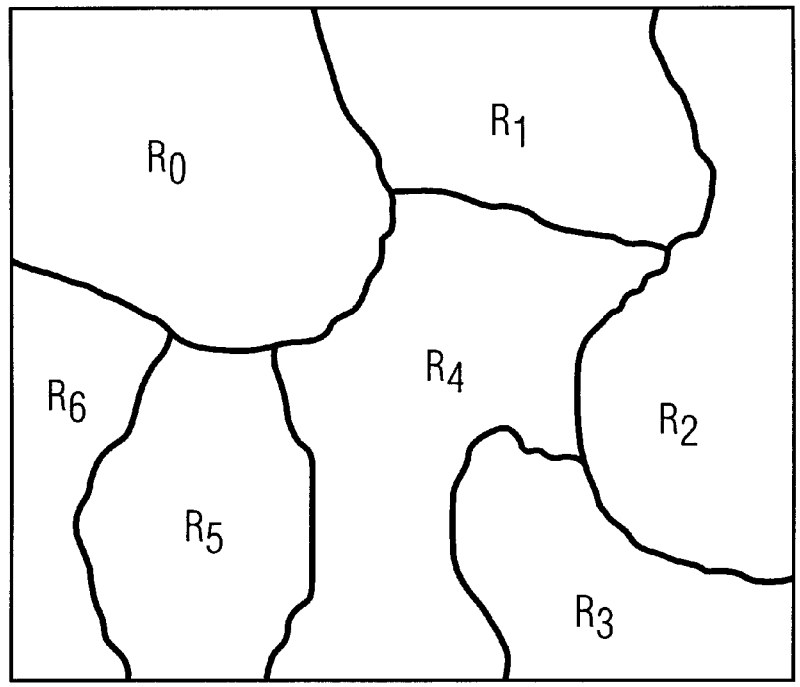
FIG. 12 is a very simplified example of a segmented picture.

The first step, implemented in a relabelling circuit 101 also shown in FIG. 10, consists in modifying the labels of the previously reconstructed partition. Such a refresh step is provided for the following reason: since some regions have been on the coding side either created or eliminated, the maximum value of the labels is increasing. The regions are then preferably relabelled in order to limit the value of label numbers, and, for technical reasons, it is simpler and more convenient to reassign a label value at the beginning of each decoding loop, in such a way that only labels 1 to N are used if there are N regions. The relabelling step then simply assigns the label "1" to the first encountered region, the label "2" to the second one, and so on.

The second step, implemented in a merging circuit 102, performs the merging orders that are contained in the buffer 80. During the third step, the regions transmitted in intra frame mode are decoded (intra regions decoding circuit 103). During the fourth step, the previously coded partition is motion compensated (motion compensation circuit 104) and the compensation errors are decoded (inter regions decoding circuit 105). The fifth and last step deals with the labelling of the decoded compensation errors partition, carried out in a decoded errors labelling circuit 106. Preferably the compensation is done exactly as it was done on the coding side: the compensation relies on the motion parameters defined for each region and, each time there is a conflict between two labels, the order information is used in view of a decision allowing to know which label will be kept. The output partition of the device 83 is the current reconstructed partition, called REC(t).

This output current partition is received by the texture decoding device 84, in which a texture compensation 84-1 is first performed (FIG. 10), and then followed by the texture decoding step 84-2 itself. As for the coding part, in which several coding techniques had been proposed (approximation by the mean value, polynomial approximation onto orthogonal basis, shape-adaptive DCT, region-based wavelets), the same methods may be used. For example, regarding the approximation by the mean value, the method consists of putting this mean value as pixel intensities to all the pixels of the current region. Regarding the polynomial approximation method, once the contour information has been decoded, the orthogonal set of basis functions can be recovered from the non-orthogonal set of basis functions and from the shape information, and then weighted by the transmitted quantized DC and AC coefficients in order to yield the reconstructed texture of each region (see once more the document "Signal Processing: Image Communication", October 1989, already cited). And so on for each texture decoding method, the decoding process being similar to the coding one. The output information of the device 84 yields the decoded picture, once each region has been similarly processed.

The invention is obviously not limited to the embodiments described hereinbefore, from which variations or improvements may be conceived without departing from the scope of this invention. For instance, in the optimization operation 222a discussed above, the main parameter is the budget, which is assumed to be given for each frame. Based on this budget, a coding strategy is defined so that it minimizes the distortion, which creates a coded sequence with a variable quality. If one wants to define a coding strategy leading to constant quality sequences, a possible modification consists in defining a target distortion value for each frame and inverting the places of D and $R_t$ in the previous explanation: the coding cost will be minimized in order to reach a given distortion. Alternatively, working at a fixed cost per frame is also possible. The optimization then works basically on a fixed nominal budget, and, if a minimum signal to noise ratio previously defined for each frame is not reached with this nominal budget, the budget is progressively increased by steps of 5% for example, this procedure being stopped when the optimum strategy has been found:

the distortion is minimal;

the budget is at least equal to the nominal one;

the signal to noise ratio is above a given threshold.

Another option may be proposed for the motion coding step 32a carried out in the device 32. While it was provided to compensate each pixel with the motion of the region it belongs to without any added constraints, with this other option, it may now be provided to carry out said pixel compensation only if there is some coherence between the label of the prediction and the current label. This compensation with restriction applies therefore only to pixels for which a correspondence between the previous and the current frame can be established: either they have the same label, or they belong to regions which have been either merged or split (splitting and merging information are contained in buffers created during the decision coding step 31a and can therefore be used to reconstruct a partition of the previous frame coherent with the current one in terms of number of regions).

For the pixels which are not motion compensated and appear as holes, these holes have to be filled by propagation, i.e. in relation with the information which may be found in their neighbourhood. Such a propagation step works as indicated. First, an extension of the compensated texture in the whole image is done by completing the holes of each region with the value of the mean of all the compensated pixels of this region, and the completed image is smoothed, for instance by morphological filtering. Then the smoothed texture is applied on the pixels which were not compensated, pixel by pixel, from neighbour to neighbour in an eight-connexity sense (to avoid artefacts at the borders of regions, the texture is propagated only between pixels belonging to the same region). It must be noted that, if it occurs that no pixel in one region can be motion compensated while respecting the constraints defined in relation with this option, the whole region is then compensated without taking into account these constraints.

Another improvement concerns the operations provided in order to define the projected partition PJ(t): they allow to define the time evolution of the regions. However such a definition is valid only if the regions are homogeneous in gray level (this is sometimes called a texture homogeneity), which is not always the case. As previously described, the successive partitions are created during the decision sub-step 22a, by selecting some regions out of the so-called partition tree. The regions of the partition tree can be either homogeneous in gray level (segmented regions) or in motion (merged regions). As a result, the various partitions that are projected are composed of a combination of regions homogeneous either in gray level or in motion.

To solve this problem, the following procedure may been implemented. The partition to be projected is first segmented until all regions are homogeneous in gray level, which creates a dense partition by opposition to the original partition which can be called a coarse partition. Then this dense partition is projected according to the procedure already described. The projected coarse partition is finally created by merging the projected regions of the dense partition.

The first and the final steps, that are additional with respect to the previous description, will now be explained in greater detail:

(a) segmentation of the coarse partition:

The goal is to create a finer partition where all regions are homogeneous in gray level. To this end, segmentation techniques similar to that used to create the lower levels of the partition tree are used. In the present implementation, a size-oriented segmentation has been used. The size parameter was progressively decreased until a given homogeneity criterion was reached. The homogeneity criterion (in this case the mean squared error of the pixels with respect to the mean of the regions) should refer to the gray level homogeneity of the pixels. At the end of this procedure, the coarse and the dense partition are available, plus a set of splitting relations saying for example that a given region of the coarse partition corresponds to the union of a set of smaller regions in the dense partition.

(b) creation of the projected coarse partition:

After projection of the dense regions, the projected coarse partition has to be created. A simple strategy consists in using the set of splitting relations. That is the projected dense regions are merged together, using the slitting relations, to form the coarse regions. However, this strategy does not guarantee that the coarse regions are made of only one connected component. Therefore, only the largest connected component of each region is preserved and the remaining connected components are removed. The empty holes created are filed by a watershed method working for as a spatial region-growing algorithm.

ANNEX A

The following description relates to the motion estimation method described in the french patent application N°9604194 filed on Apr. 3, 1996. The main aspects of this method will be hereinafter recalled:

(A) Generalities on motion estimation:

(1) Aim of the motion estimation step:

Given the two textured images P(t−1) and P(t) at times (t−1) and t, and, at time t, the partition S(t) that was deduced from the projection, the motion estimation process will return for each region $R_i$ (i=0 to 6 in FIG. 12) of S(t) a set of motion parameters describing the motion of $R_i$ between (t−1) and t. This process is used in two slightly different contexts during the coding:

the motion is first estimated for the partition resulting from the projection (in the following this partition will be considered as the projected level of the partition tree);

the motion is then reestimated at each other level of the partition tree, knowing the results of the estimations done immediately before.

In both cases, the way the motion information is stored in the transmission buffers is also described.

Figure 13:
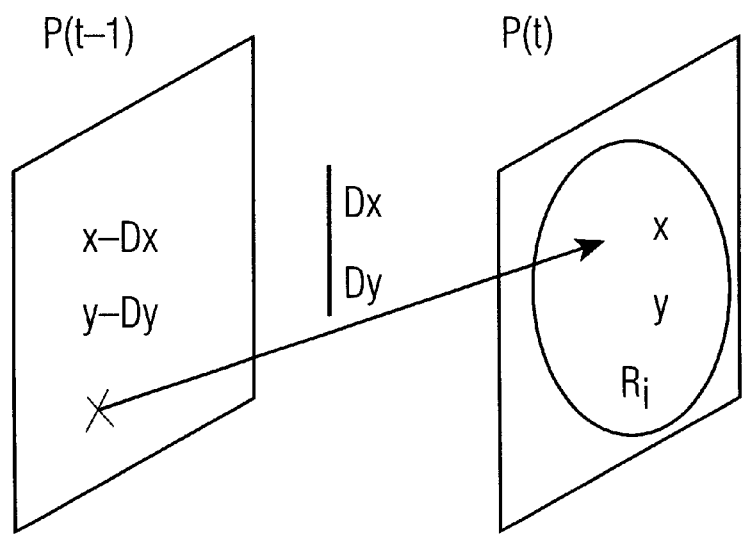
FIG. 13 is a schematic illustration of a type of motion between two successive pictures P(t−1) and P(t)

(2) Motion model and parameters representation:

On each region $R_i$ of the partition S(t), the motion between P(t−1) and P(t) is theoretically defined as (Dx, Dy) such that:

$$L(x,y,t)=L(x-Dx, y-Dy, t-1) \qquad (1)$$

where L(x,y,t) is the luminance in P(t) at the position (x,y) (see FIG. 13 illustrating this motion representation). As a block based motion estimation may disconnect regions, the only way to avoid this and to remain coherent is to choose a region-based representation of motion. The model should be both compact and able to deal with quite complex tridimensional motions. The solution is to use polynomial motion models. In fact, it means practically that (Dx, Dy) are two polynomials of order 0, 1 or 2 (i.e. defined by 2, 6 or 12 parameters). In the sequel, the type of motion designates the kind of motion model used (i.e. translational for 0 order polynomial or 2 parameters, affine for 1rst order polynomial or 6 parameters, quadratic for 2nd order polynomial or 12 parameters). The motion parameters are the set of coefficients of one pair (Dx, Dy) of polynomials. Note that a set of motion parameters is always associated to a given region of P(t).

(3) Estimation of motion parameters:

Due to the number of motion parameters characterizing one region, it is difficult to use a conventional matching method to estimate the motion, and a differential method is preferred. This method iteratively refines the motion on each region by following the direction of the gradient of the equation (1) locally linearized. This method has however a serious drawback if it is not carefully implemented: the convergence may be trapped in a local minimum. In the following section (B), it is described how to minimize this drawback.

(B) Steps of the implementation of the motion estimation (projected level)

Figure 14:
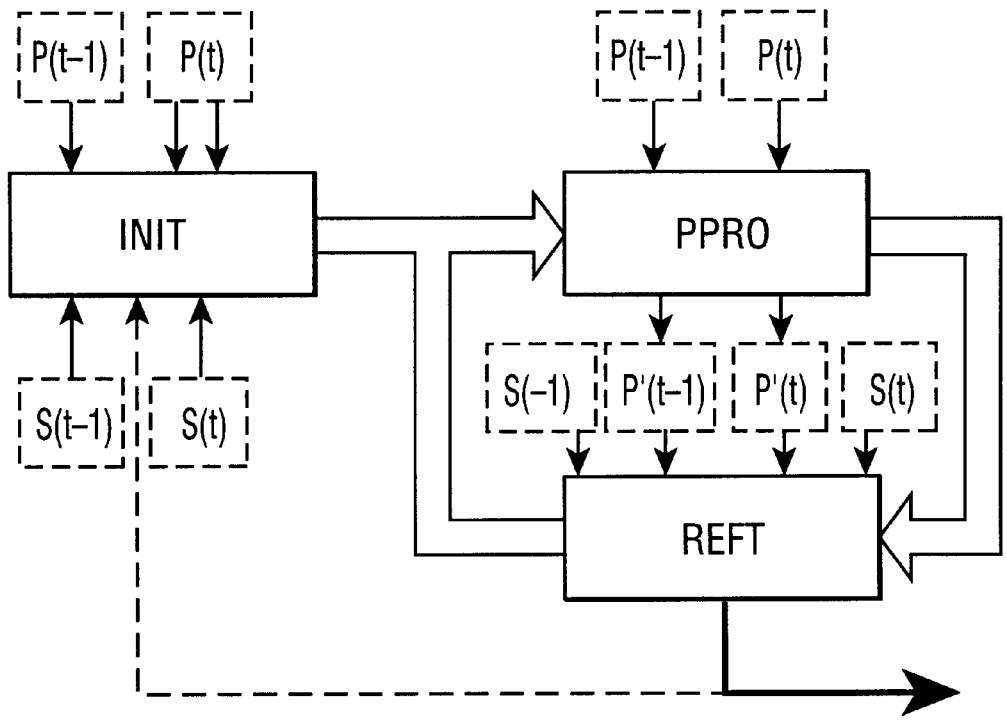
FIG. 14 illustrates a possible solution for implementing one of the motion estimation steps carried out during the merging operation of FIG. 4.

The steps constituting the motion estimation between two given images P(t−1) and P(t) are illustrated in FIG. 14. As just said, the convergence of the differential method may be difficult. It means that what is called the "refinement" of the motion parameters cannot be efficiently runned alone, and is therefore embedded in a multiresolution scheme, properly initialized. First an "initialization" step (INIT) associates to each region of P(t) a set of motion parameters that is a good start for the motion estimation process. Then, the motion parameters are successively refined using multiresolution, which means that the successive motion refinement iterations are run on different pairs of filtered and non filtered images, calculated in a "preprocessing" step (PPRO) (P'(t) and P'(t−1) in FIG. 14). A final "refinement" step (REFT) is performed between the two originally given images.

(1) Initialization of parameters:

The aim of this step UNIT is to determine for each region the motion parameters best suited to start the estimation from. It is assumed that the best parameters are the ones leading to the smallest prediction error on the region. The principle of the initialization will therefore be the following: on each region $R_i$ a prediction (the principle of which is explained in the motion parameters refinement section) is done with several proposals of motion parameters and, in order to start the estimation on $R_i$, the parameters that lead to the minimum mean square prediction error on this region are kept. Four proposals which are chosen for their complementarity and for their simplicity to be deduced from the already available information are then tested on each region. Physically, these proposals take into account the following cases:

the region has no motion;

the motion of the region did not change since last frame (or was present in the last frame in the neighbourhood of the region);

the region is currently rigid and in the foreground, i.e. its motion is close to the general displacement of its contours;

none of these cases: the best approximation of the motion will then be deduced from a dense motion field calculated on the regions by means of an adapted block matching.

Practically, the following motions for each region are tried:

no motion: null polynomial;

previous motion: motion of the current region at (t−1), and of all of its neighbours at time (t−1) also;

label motion: translational motion of the gravity center of the region between times (t−1) and t;

dense field: polynomial approximation on a region of vectors calculated by a variable sized block matching, the sizes of the blocks being reduced at the region boundaries to fit within the region (the method for fitting a polynomial on those values is the same than the one used for polynomial texture coding).

(2) Preprocessing of images:

The aim of the filtering process PPRO is to build images where the signal is better suited to the estimation process (i.e. is close to verify the mathematical hypothesis required by the theory to ensure convergence), without being too different from the original luminance signal (so that the motion to estimate remains very close to the original one). To this end, a low-pass recursive isotropic filter, which approximates a gaussian one, is used. It has the advantage of realizing a good trade-off between smoothing the edges and keeping their localization in the image. The isotropy is exact in the four main directions of the image plane. The successive filtering and the associated refinement steps are organized in the present example as follows:

three refinement iterations are run on images filtered with a variance of 1.5;

five refinement iterations are run on non-filtered images;

three refinement iterations are run on images filtered with a variance of 0.8;

five refinement iterations are run on non-filtered images.

After the parameters have been refined on a filtered image, it must be decided if one wants to keep these refined parameters or if the initial ones were in fact better. To this aim, before any step of refinement iterations, the current motion parameters of each region are stored. After the refinement, on each region, the refined parameters replace the previously recorded ones only if they lead to a smaller mean square prediction error of the region on the non filtered images.

(3) Motion parameters refinement:

This step REFT leads to a linear set of n equations, and the variations of motion parameters on a given region are the solutions of this conventional linear system: [A].[x]=[B], where the matrix terms depend on the current pixel coordinates, on the horizontal and vertical gradients at the previous pixel positions in P(t−1), and on the luminance values at its positions in P(t) and P(t−1). Knowing P(t), the associated motion parameters, and P(t−1), it is necessary to be able to calculate the motion compensated value of the luminance at each pixel of the current image. In the sequel, this operation is called a prediction. Applied on the whole image, the prediction gives the motion predicted—or motion compensated—image. This process can be divided into two different steps:

(i) first one determines from where the compensated value should be taken in the previous image. The current pixel is at the position (x,y) at time t, and the motion of the region it belongs to is defined by:

$$(Dx, Dy)=(a_1+a_2 x+a_3 y, a_4+a_5 x+a_6 y). \tag{2}$$

Then, the pixel position at time (t−1) is given by:

$$(x-Dx, y-Dy)=(-a_1+(1-a_2)x-a_3 y, -a_4-a_5 x+(1-a_6)y). \tag{3}$$

The positions returned by this first step are non-integer values.

(ii) the luminance should therefore be interpolated in order to find the final value of the current pixel at time (t−1) for instance with a bicubic filter (called FiltMot0 in the sequel). The filtering is done in both horizontal and vertical directions, and the mean between the two interpolated values is finally kept. The gradient values should also be interpolated on non-integer positions. The used filter is a derivative of FiltMot0. The interpolation method is the same than the one used during the prediction, except that the results of horizontal and vertical filtering are used independently (no mean is therefore calculated). Once the matrix is built, the system has to be solved. If the matrix [A] is not singular, it is inverted, for instance by means of the Householder method, the solution being:

$$[x]=[A]^{-1}.[B] \qquad (4)$$

If [A] is singular, [x] is a null vector and the motion parameters remain unchanged on this region after the current iteration.

After the motion refinement has been performed on one region $R_i$, leading to a new set of motion parameters, the best motion for $R_i$ has to be selected, and it must also be verified if this new set can be of any help for the estimation on neighbouring regions ("pseudo-relaxation" step). First the motion kept for $R_i$ is the one leading to the smallest prediction error on $R_i$ between said new set, the former motion of $R_i$, and the motions of all the neighbours of $R_i$. Then all the neighbouring regions are predicted with this motion kept for $R_i$, and their motion is replaced by this one if it leads to a smaller prediction error.

Figure 15:
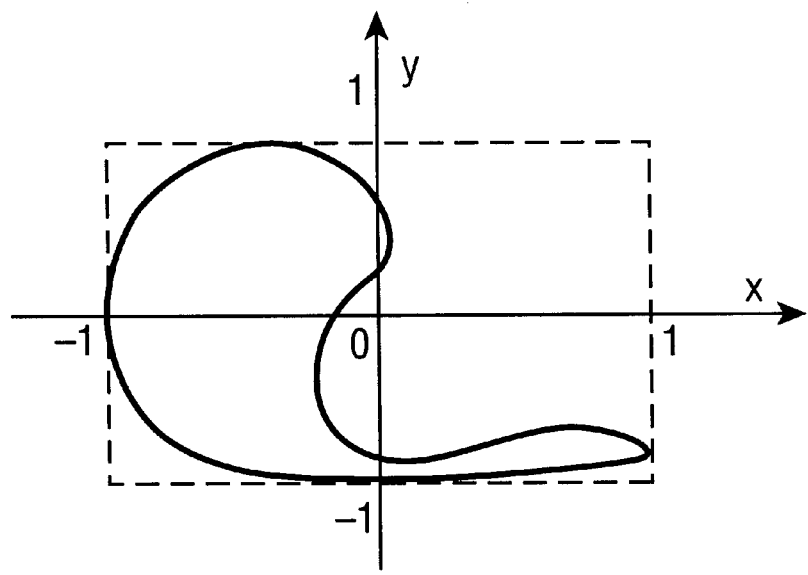
FIG. 15 shows local axis and scales for a given region, with a normalizing coefficient equal to two.

It must be noticed that, during the refinement step, the motion parameters should be expressed locally with respect to their associated region. Because of the polynomial expression of motion, the values of the pixel coordinates regulate the influences each order of motion has on the displacement amplitude. It is therefore important to normalize these values to both find a good balance between the different orders and keep the estimation process independent from the position of the region in the image. FIG. 15 shows the local axis and scales here used, i.e. in the case of a normalizing coefficient equal to 2 and for a region as the one illustrated.

(C) Specificities of the reestimation process:

The reestimation process is performed after the motion has been estimated on the projected level. It means that, at this stage, the motion associated to the projection related to the now considered partition S(t) by either merging or resegmenting is known, which allows to have a very good initialization of the current motion. The principle of the estimation remains the same. The implementation is only simplified because it is justified to suppose to be close to the motion to estimate. The differences in the implementation are summarized in the sequel:

initialization step: the "no motion" and "dense field" hypothesis described above are both tested on each region. Then, if S(t) is a re-segmented partition, on each region $R_i$ of S(t) the motions of the parent region of $R_i$ and of the parent regions of each neighbour of $R_i$ are also tried out. Otherwise, if S(t) is a merged partition, on each region $R_i$ of S(t) the motions of the sons of $R_i$ and of all its sons neighbours are tried out.

preprocessing step: no filtering is done, two refinement iterations are run on the non-filtered images.

The refinement step remains of course the same.

ANNEX B

The following description relates to the coding method described in the European patent application N°95401813.1 filed on Aug. 2, 1995. The main aspects of this method will be hereinafter recalled, while using the following notations:

the original images at times (T−1), T, . . . , are called ORIG(−1), ORIG(0), . . . , and so on;

the partitions are called SEG(0) for the current partition at time T, SEG(−1) for the previous partition at time (T−1), and so on if necessary for other partitions at other times;

similarly REC(0) and REC(−1) designate the current (at time T) and previous (at time (T−1)) partitions as they would be reconstructed on the receiver side after transmission, and as they are obtained in the encoding device (obviously REC(0), REC(1), . . . , are not exactly the same as SEG(0), SEG(−1), . . . , if losses occur during the partition coding process);

MOT(0) is the motion information that characterizes the evolution of the partition between (T−1) and T (i.e. that allows to deduce SEG(0) from SEG(−1)), and is generally represented by a set of parameters that are assigned to each region of the previous partition SEG (−1).

This coding method, schematically shown in FIG. 16, comprises in cascade the following steps: first a definition of the transmission mode of each region (from 501c to 503e), and then the order computation (from 504c to 505). For the first step of definition of the transmission mode, the input data are the current segmented partition SEG(0) (obtained from the corresponding original image ORIG(0)), the previous reconstructed partition REC(−1), and the motion information MOT(0) associated to the partition SEG(−1). The objective of this first step is to define the transmission mode (intra-frame mode or inter-frame mode) of each region, by sending a binary information used to say to the receiver whether or not the region is transmitted in intra-frame mode for contour coding and stored for instance within the motion information MOT(0). This motion information MOT(0) therefore involves a set of motion parameters for each region (as already said) plus a binary information indicating the transmission mode of the associated contours. The decision about this transmission mode is taken on the basis of the cost of the contour, by comparing the cost of each region according to the fact that it is sent in intra-frame mode or in inter-frame mode. As shown in FIG. 16, three sub-steps are considered in this first step.

The first sub-step, comprising two operations 501c and 501d, is provided for compensating the whole partition. Based on the previous reconstructed partition REC(−1), the motion information MOT(0) and the order information, called ORD(0), this partition compensation, described later in a more detailed manner, leads to a compensated partition called RECCOMP(0). In a second sub-step 502, a compensation error ERR(0) is then computed by way of a subtraction between SEG(0) and RECCOMP (0). Finally, a third substep, comprising three operations 503c, 503d, 503e is provided for estimating and comparing the coding costs of each region individually, as defined by SEG(0) (intra-frame mode) or by ERR(0) (inter-frame mode). The estimations (operation 503c) in intra-frame and inter-frame mode can be done either by actually coding the information and measuring the resulting amount of information or by using any other technique that provides an approximation of the cost (for example, by assuming that the cost is proportional to the length of the contour of the region). Once both estimations have been performed, the comparison and selection (operation 503d) can be done, and the resulting decision is stored (operation 503e) as the additional binary information updating the motion information MOT(0).

The first step of definition of the transmission mode is followed by the second step of order computation, which can be decomposed, as shown in FIG. 16, in a first sub-step (comprising two operations 504c, 504d) and a second sub-step 505. This first sub-step is provided for estimating a set of order parameters and the second sub-step for achieving a quantization of the order information for the transmission. The first sub-step (504c, 504d) relies on a double loop, a first one scanning the regions defined by their label and a second one scanning the positions (i,j) of the image space, and involves two operations in cascade.

The first operation 504c is provided for defining a motion vector for each position (i,j) of the region corresponding to the concerned label. The motion information MOT(0) gives indeed for each region a motion model which is a function of the position (i,j). For instance, if the motion model for a given region is a translation (dx, dy), then this motion vector is assigned to all points (i,j) of the image. If the motion model is an affine model ($a_1$, $a_2$, $a_3$, $a_4$, $a_5$, $a_6$), then the motion field at the point (i,j) is defined as $Vx(i,j)=a_1 i+a_2 j+a_3$ and $Vy(i,j)=a_4 i+a_5 j+a_6$. If the region has to be transmitted in intra-frame mode, this motion field expansion is not performed.

The second operation 504d is provided for updating the order corresponding to the concerned region. The order information consists in a list of possible regions in conflict, i.e. of regions of REC(-1) that may overlap with other regions during the motion compensation. Such an order list is set to zero at the beginning of the process. If one denotes by LABSEG(0) and LABREC(-1) the region labels of the current pixel (i,j) in the current partition SEG(0) and of the pixel (i-Vx(i,j), j-Vy(i,j)) in the previous reconstructed partition REC(-1), the list entry corresponding to the conflict between the region of label REGNUM (REGNUM is a working label associated to each region successively considered in the current partition SEG(0)) and the region having the current label LABSEG(0) is updated if the following conditions are fulfilled:

(a) the current label LABSEG(0) is different of any label of a region transmitted in intra-frame mode: in that situation (i.e. if the point (i,j) in the current partition SEG(0) corresponds to a region which is transmitted in intra-frame mode), any compensated label that falls in such a position is discarded;

(b) the previous label LABREC(-1) is identical to the label REGNUM: the point (i,j) of the current partition SEG($_0$) is then a candidate to receive this label REGNUM;

(c) the current label LABSEG(0) is not identical to the label REGNUM: the correct label of the pixel (i,j) is then not REGNUM, and the regions with the current label LABSEG(0) and the label REGNUM (=LABREC(-1)) are conflicting regions, the first one being in the foreground of the second one (the list entry corresponding to the conflict between the labels LABSEG(0) and REGNUM is then incremented by one unity).

This procedure is iterated for all points (i,j) and for all labels REGNUM, the order list finally giving the number of occurrences where it has been possible to declare that a given region is in the foreground of another region.

The second sub-step 505 is then provided in cascade with the first one (504c, 504d) for quantizing the order (the receiver will only need a binary decision in order to be able to solve the situations with conflicting labels during the motion compensation). This quantization is achieved by comparing for each pair of labels the number of occurrences where the first one has been declared to be in the foreground of the second one with the number of occurrences where that second one has been declared to be in the foreground of the first one. The final order between the two concerned regions is defined as the one corresponding to the largest number of occurrences. This order ORD(0) may then be sent backwards for use as an input for the sub-step (501c, 501d), in order to constitute an iterative loop in which said order information allows to update the definition of the contour transmission mode (the number of the iterations is kept low if one wants not to increase the computational load: in practice, only two or three iterations are sufficient). It must be noted, in this case of an iterative loop, that the partition compensation cannot be done if the order information ORD (0) is not known. To solve this problem, it is simply supposed on a first iteration that all new regions (i.e. regions which are present in SEG(0) and not present in REC(-1)) are transmitted in intra-frame mode and that all other regions are sent in inter-frame mode, which is equivalent to give to ORD(0) an initial value designated by the reference $ORD_0$ in FIG. 16.

The above-mentioned partition compensation is now be described in a more detailed manner. The sub-step (501c, 501d) is intended to realize the compensation of the previous reconstructed partition REC(-1) and comprises several operations. The first one, the operation 501c, is provided for defining a motion field for the entire image while using the motion parameters assigned to a single region, the current one of label REGNUM. This definition operation, similar to that one previously described (first operation 504c of the first sub-step of the second step "order computation"), is followed by a second operation 501d (compensation operation), according to which, for each pixel (i,j) of the compensated partition RECCOMP(-1), the compensated label is defined as follows (the procedure being iterated for all pixels (i,j) and for all regions, that is to say for all labels REGNUM):

(a) if the pixel (i,j) corresponds to a region which has been transmitted in intra-frame mode, any compensated label that falls in that region is discarded;

(b) if the previous label LABREC(-1) (i.e. the region number of the pixel (i-Vx(i,j), j-Vy(i,j)) in the previous partition REC(-1) is identical to the current label REGNUM, the pixel (i, j) is a candidate to receive the label REGNUM;

(c) if the location (i,j) of the compensated partition is empty, the label LABREC(-1) must be assigned to that position;

(d) if the location (i,j) has already received a label, this one is in conflict with the previous label LABREC(-1), but this conflict can be solved by the order information stored in ORD(0).

At the end of this procedure, one has the final compensated partition RECCOMP(0). Once the order information has been defined, the encoding step of the coding method, designed by a reference 506 in FIG. 16, can be carried out, for instance by following the contour/texture coding approach described in the communication "Motion and region overlapping estimation for segmentation-based video coding", M. Pardàs, P. Salembier and B. González, IEEE International Conference on Image Processing, Austin, Tex. (USA), November 1994, volume II, pp. 428–432.

We claim:

1. A method of coding segmented pictures, or partitions, that correspond to a sequence of original pictures and identify in said pictures contours and closed regions to which corresponding labels are associated, said method comprising a first definition step for defining the time motion evolution of the partitions between two successive pictures and a second coding step for coding motion, contours and textures of said regions of successive partitions, wherein, for each current partition considered with respect to the previous one, the first step comprises in cascade:

(1) a motion estimation and compensation sub-step, for the definition of a motion-compensated partition marking for each region coming from the previous partition the position of the core of the region in the current partition;

(2) a temporal extension sub-step of said regions previously defined by compensation in the current partition, for the definition of a so-called projected partition;

(3) an iterative partition topology definition sub-step, for the determination, on the basis of motion and texture criteria, of additional partitions created iteratively either by merging or re-segmenting regions of said projected partition, said additional partitions and the projected partition forming levels of a partition tree;

(4) a decision sub-step, for the selection of the regions of an optimal partition within the proposals of regions contained in any level of said partition tree and of the best strategy for coding each region of said optimal partition, said successive optimal partitions constituting the sequence of the partitions to be coded, wherein said decision sub-step comprises a decision tree definition sub-step for the selection of an optimal partition among the projected and additional partitions contained in said partition tree and an optimization sub-step for selecting the most appropriate coding strategy with respect to each region of said optimal partition; said second step then comprising, for the definition of the coded information that has to be transmitted and/or stored for each region of said partitions, a decision coding sub-step.

2. A coding method according to claim 1, wherein said motion estimation and compensation sub-step comprises a motion estimation operation, by way of a block matching method, and a motion compensation operation, by keeping from every region in the previous partition only its largest connected component marking with the same label as in the previous partition the position of the core of said region in the current partition, and said temporal extension sub-step comprises the implementation of a watershed lines method.

3. A coding method according to claim 1, wherein a texture coding method to be applied to each region of said optimal partition is chosen within a list comprising the method of approximation by mean value, the polynomial approximation method, the shape adaptive discrete cosine transform method, and the dyadic bidimensional wavelet transform method.

4. A coding method according to claim 1, wherein said first definition step also comprises in cascade with the first ones the following additional sub-steps:

(1) before the motion estimation and compensation sub-step, an additional segmentation sub-step for segmenting the current partition, then called a coarse partition, until all regions are homogeneous according to a given criterion, said segmentation sub-step allowing to create a so-called dense partition;

(2) between the temporal extension sub-step and the partition topology definition sub-step, an additional merging sub-step for merging the projected regions of said dense partition, said merging sub-step allowing to define a so-called projected coarse partition.

5. A coding method according to claim 4, wherein said additional segmentation is a size-oriented one, the size parameter being progressively decreased until a given homogeneity criterion referring to the gray level homogeneity of the pixels, such as the mean squared error of the pixels with respect to the mean of the regions, is reached.

6. A system for coding segmented pictures, or partitions, that correspond to a sequence of original pictures and identify in said pictures contours and closed regions to which corresponding labels are associated, said system comprising a first time motion evolution defining sub-system and a second motion, contour and texture coding sub-system, in which the coded information to be transmitted and/or stored for each current partition comprises coded signals corresponding to an optimal partition composed either of regions of a main partition determined by a motion estimation and compensation of a previous partition or of regions of additional partitions created iteratively by merging or re-segmenting said regions of the main partition in accordance with a motion and a texture criteria of neighboring regions, wherein the first mentioned sub-system comprises means for selecting an optimal partition among proposed regions comprised of the regions of the main partition determined by the motion estimation and compensation and the regions of additional partitions created iteratively by the merging or re-segmentation, the proposed regions forming levels of a partition tree, and for selecting the most appropriate coding strategy with respect to each region of the optimal partition; said coded signals including the appropriate indications on the origin of each region, in the form of merging orders and splitting information.

7. A coding system according to claim 6, in which, for each current partition considered with respect to the previous one:

(I) said first sub-system comprises:
  (A) a first partition preprocessing sub-assembly, comprising:
    (1) a time evolution definition device, comprising:
      (a) a motion estimation circuit;
      (b) a motion compensation circuit; and
      (c) a temporal extension circuit, the output of which constitutes a so-called projected partition defining said main partition;
    (2) a partition topology definition device, comprising:
      (d) at least a merging circuit; and
      (e) at least a re-segmenting circuit;
    the output of said partition topology device constituting the levels of the partition tree composed of said projected partition and of the additional partitions created by said merging and re-segmenting circuits;
  (B) a second decision sub-assembly, comprising:
    (f) a decision tree construction circuit; and
    (g) an optimization circuit;
  the output of said decision sub-assembly constituting an optimal partition sent to said second coding sub-system, and said optimal partition being obtained by an association of regions from various levels of the partition tree;
(II) said second sub-system comprises:
  (C) a third coding sub-assembly, comprising:
    (4) a first decision decoding device;
    (5) a second motion coding device;
    (6) a third contour coding device;
    (7) a fourth texture coding device; and
    (8) a multiplexer of the coded output signals of said four coding devices.

8. A coding system according to claim 7, in which said merging circuit comprises a motion estimation stage and a merging proposition stage, and is followed by a second similar merging circuit, and so on, in order to build the upper levels of said partition tree by merging from the projected partition neighbouring regions which have a similar motion.

9. A coding system according to claim 7, in which said decision tree construction circuit comprises a distortion computation stage, a rate computation stage and a memory, said memory being provided for storing in the form of a decision tree a list of distortions and a list of rates having both the same length as an associated list of texture coding methods in which a selection is made for the coding operation of the texture of each region of said partition tree, and said optimization circuit comprises a computing sub-stage, provided for making a local analysis of each node of said decision tree, and a decision sub-stage, provided for defining from the whole set of regions of the partition tree a final set of the regions that constitute said optimal partition to be coded.

10. A coded signal corresponding, with respect to a sequence of segmented pictures comprising a plurality of regions and associated labels and defining successive partitions, to each region of the current partition of said sequence, said coded signal consisting of a multiplexed signal comprising:
(A) a coded motion information, corresponding to the estimation of a motion model that characterizes the evolution of the segmentation between said successive partitions and allows to define a so-called projected partition;
(B) a coded partition information, corresponding to texture and contour information of each region of an optimal partition selected, on the basis of rate and distortion criteria, among all the regions of a hierarchy of additional finer and coarser partitions constructed from the projected partition corresponding to the current one, wherein levels of a partition tree are formed from said hierarchy and include additional partitions created by iteratively merging or re-segmenting regions of the projected partition in accordance with a motion and a texture criteria of the regions; and
(C) a coded decision information, corresponding to the coding strategy defined for each of said selected regions of the projected and the additional partitions, according to the coding cost and quality associated to said rate and distortion criteria.

11. A storage medium for storing a coded signal corresponding, with respect to a sequence of segmented pictures comprising a plurality of regions and associated labels and defining successive partitions, to each region of the current partition of said sequence, said coded signal consisting of a multiplexed signal comprising:
(A) a motion information, corresponding to the estimation of a motion model that characterizes the evolution of the segmentation between said successive partitions and allows to define a so-called projected partition;
(B) a partition information, corresponding to texture and contour information of each region of an optimal partition selected, on the basis of rate and distortion criteria, among all the regions of a hierarchy of additional finer and coarser partitions constructed from the projected partition corresponding to the current one, wherein levels of a partition tree are formed from said hierarchy and include additional partitions created iteratively by merging or re-segmenting regions of the projected partition in accordance with a motion and a texture criteria of the regions; and
(C) a decision information, corresponding to the coding strategy defined for each of said selected regions of the projected and the additional partitions, according to the coding cost and quality associated to said rate and distortion criteria.

12. A method for decoding signals corresponding to segmented pictures, or partitions, that identify in an associated sequence of original pictures contours and closed regions to which corresponding labels are associated and having been previously coded by a coding method comprising a first definition step provided for defining, for each current partition considered with respect to the previous one, on the one hand a so-called projected partition obtained by motion estimation and compensation and a temporal extension of the compensated partition and on the other hand additional partitions created iteratively either by merging or re-segmenting regions of said projected partition in accordance with a motion and a texture criteria of neighboring regions, and for selecting an optimal partition composed of regions contained in any level of a partition tree formed by said projected and additional partitions, and a second coding step provided for the definition of the coded information that has to be transmitted and/or stored for each region of each of the successive optimal partitions, wherein said decoding method comprises a first decision decoding step, provided for defining which coding strategy has been previously used for each region of each optimal partition, a second motion decoding step, a third partition decoding step, and a fourth texture decoding step.

13. A decoding method according to claim 12, wherein said third partition decoding step comprises a first relabelling sub-step, provided for limiting the value of label numbers by reassigning a label value to each region, only labels 1 to N being used if there are N regions, a second merging sub-step, provided for performing the merging orders, a third intra regions decoding sub-step, a fourth motion-compensation and compensated errors decoding sub-step, and a decoded compensation errors partition labelling sub-step.

14. A system for decoding signals corresponding to segmented pictures, or partitions, that identify in an associated sequence of original pictures contours and closed regions to which corresponding labels are associated, said signals constituting for each current partition a coded information corresponding to an optimal partition composed of selective ones of proposed regions comprised of regions of a main partition determined by a motion estimation and compensation of a previous partition and a temporal extension of the compensated partition and of regions of additional partitions created iteratively by merging or re-segmenting regions of the main partition in accordance with a motion and a texture criteria of neighboring regions, the proposed regions forming levels of a partition tree, wherein said decoding system comprises an input buffer, provided for storing and demultiplexing said coded information, a decision decoding device, provided for decoding the information corresponding to the strategy used for coding said optimal partition, a motion decoding device, a partition decoding device, and a texture decoding device.

* * * * *